US012632904B2

(12) United States Patent
Gross et al.

(10) Patent No.: US 12,632,904 B2
(45) **Date of Patent: *May 19, 2026**

(54) SYSTEMS AND METHODS FOR GENERATING MOBILITY INSURANCE PRODUCTS USING RIDE-SHARING TELEMATICS DATA

(71) Applicant: State Farm Mutual Automobile Insurance Company, Bloomington, IL (US)

(72) Inventors: Ryan Michael Gross, Normal, IL (US); Joseph Robert Brannan, Bloomington, IL (US); Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,233

(22) Filed: Aug. 27, 2024

(65) Prior Publication Data

US 2024/0420245 A1 Dec. 19, 2024

Related U.S. Application Data

(63) Continuation of application No. 18/331,760, filed on Jun. 8, 2023, now Pat. No. 12,112,387, which is a
(Continued)

(51) Int. Cl.
*G06Q 40/08* (2012.01)
*G06Q 10/20* (2023.01)
(Continued)

(52) U.S. Cl.
CPC ............. *G06Q 40/08* (2013.01); *G06Q 10/20* (2013.01); *G06Q 30/0206* (2013.01);
(Continued)

(58) Field of Classification Search
None
See application file for complete search history.

(56) References Cited

U.S. PATENT DOCUMENTS 6,980,670 B1 12/2005 Hoffman et al.
8,036,824 B2 * 10/2011 Huang .................. G06Q 50/01
701/408
(Continued)

FOREIGN PATENT DOCUMENTS

EP 3239686 A1 11/2017
EP 3578433 B1 8/2020
(Continued)

OTHER PUBLICATIONS

B. He, D. Zhang, S. Liu, H. Liu, D. Han and L. M. Ni, "Profiling Driver Behavior for Personalized Insurance Pricing and Maximal Profit," 2018 IEEE International Conference on Big Data (Big Data), Seattle, WA, USA, 2018, pp. 1387-1396. (Year: 2018).*
(Continued)

*Primary Examiner* — Mohammad Z Shaikh
(74) *Attorney, Agent, or Firm* — Armstrong Teasdale LLP

(57) ABSTRACT

A personalized insurance ("PI") computing device for determining an optimal insurance product for a driver operating a vehicle for a transportation network company ("TNC") during a period of increased demand includes at least one processor in communication with at least one memory. The processor is configured to: (i) receive, from a TNC, data indicating increased demand for transportation services, (ii) retrieve driver data that includes the driver history, (iii) generate an optimal pricing model for the driver based upon the increased demand and the driver data, (iv) execute the model to determine an optimal insurance product having characteristics reflecting at least one risk factor associated with the increased demand for transportation services and a risk profile determined from analyzing the driver data, and
(Continued)

(v) transmit an offer to the driver to provide transportation services at an increased earnings rate and with the determined optimal insurance product.

17 Claims, 13 Drawing Sheets

Related U.S. Application Data continuation of application No. 16/780,634, filed on Feb. 3, 2020, now Pat. No. 11,954,736.

(60) Provisional application No. 62/934,948, filed on Nov. 13, 2019, provisional application No. 62/934,932, filed on Nov. 13, 2019, provisional application No. 62/892,853, filed on Aug. 28, 2019, provisional application No. 62/892,916, filed on Aug. 28, 2019.

(51) Int. Cl.
| | |
|---|---|
| *G06Q 30/0201* | (2023.01) |
| *G06Q 30/0282* | (2023.01) |
| *G06Q 50/40* | (2024.01) |
| *G07C 5/00* | (2006.01) |
| *G07C 5/08* | (2006.01) |

(52) U.S. Cl.
CPC ......... *G06Q 30/0282* (2013.01); *G06Q 50/40* (2024.01); *G07C 5/008* (2013.01); *G07C 5/0808* (2013.01); *G07C 5/085* (2013.01)

(56) References Cited

U.S. PATENT DOCUMENTS

| | | | |
|---|---|---|---|
| 8,566,126 B1 * | 10/2013 | Hopkins, III ............ | G08G 1/09 |
| | | | 340/439 |
| 8,688,532 B2 | 4/2014 | Khunger et al. | |
| 9,311,271 B2 | 4/2016 | Wright | |
| 9,633,487 B2 | 4/2017 | Wright | |
| 9,688,286 B2 | 6/2017 | Wilkes, III et al. | |
| 9,754,425 B1 | 9/2017 | Iqbal et al. | |
| 9,764,742 B1 | 9/2017 | Goldfarb et al. | |
| 9,786,009 B2 * | 10/2017 | Schumann, Jr. ....... | G06Q 40/08 |
| 9,830,748 B2 | 11/2017 | Rosenbaum | |
| 9,916,625 B2 | 3/2018 | Lehman et al. | |
| 9,990,782 B2 | 6/2018 | Rosenbaum | |
| 9,996,884 B2 | 6/2018 | Collopy et al. | |
| 10,013,719 B1 * | 7/2018 | Christensen ....... | G06Q 10/0635 |
| 10,049,408 B2 | 8/2018 | Carver et al. | |
| 10,089,694 B1 | 10/2018 | Biemer | |
| 10,133,942 B2 | 11/2018 | Gleeson-May et al. | |
| 10,192,369 B2 | 1/2019 | Wright | |
| 10,198,879 B2 | 2/2019 | Wright | |
| 10,269,190 B2 | 4/2019 | Rosenbaum | |
| 10,373,257 B1 | 8/2019 | Iqbal et al. | |
| 10,373,259 B1 | 8/2019 | Konrardy et al. | |
| 10,449,967 B1 | 10/2019 | Ferguson | |
| 10,467,824 B2 | 11/2019 | Rosenbaum | |
| 10,475,127 B1 | 11/2019 | Potter et al. | |
| 10,540,723 B1 | 1/2020 | Potter et al. | |
| 10,552,912 B1 | 2/2020 | Roll et al. | |
| 10,565,593 B1 | 2/2020 | Aabram et al. | |
| 10,566,593 B2 | 2/2020 | Hying et al. | |
| 10,599,155 B1 | 3/2020 | Konrardy et al. | |
| 10,664,917 B1 | 5/2020 | Wasserman | |
| 10,692,149 B1 | 6/2020 | Loo et al. | |
| 10,726,493 B1 * | 7/2020 | Kyne ..................... | G07C 5/02 |
| 10,773,672 B2 * | 9/2020 | Takeuchi ................ | B62J 50/00 |
| 10,783,587 B1 * | 9/2020 | Augustine ............. | G06Q 40/08 |
| 10,803,525 B1 | 10/2020 | Augustine et al. | |
| 10,830,605 B1 | 11/2020 | Chintakindi et al. | |
| 10,832,342 B1 | 11/2020 | Gregorio et al. | |
| 10,885,539 B1 | 1/2021 | Purgatorio et al. | |
| 10,895,463 B1 * | 1/2021 | Cope ..................... | G06Q 10/02 |
| 10,915,964 B1 | 2/2021 | Purgatorio et al. | |
| 10,984,479 B1 * | 4/2021 | Kyne ..................... | H04L 67/12 |
| 11,023,898 B1 * | 6/2021 | Aabram ............. | G07F 17/0014 |
| 11,030,696 B1 | 6/2021 | Potter et al. | |
| 11,227,452 B2 | 1/2022 | Rosenbaum | |
| 11,257,162 B1 * | 2/2022 | Saban ................... | G06Q 40/08 |
| 11,312,385 B1 * | 4/2022 | Russo ................ | G07C 5/0841 |
| 11,407,410 B2 | 8/2022 | Rosenbaum | |
| 11,436,683 B1 * | 9/2022 | Kyne ..................... | G07C 5/02 |
| 11,524,707 B2 | 12/2022 | Rosenbaum | |
| 11,544,791 B1 * | 1/2023 | Gross ............. | G06Q 30/0282 |
| 11,562,435 B2 * | 1/2023 | Perl ..................... | G06Q 40/08 |
| 11,578,990 B1 * | 2/2023 | Chintakindi ....... | G01C 21/3484 |
| 11,594,083 B1 | 2/2023 | Rosenbaum | |
| 11,599,947 B1 * | 3/2023 | Gross ................... | G06Q 50/40 |
| 11,722,658 B2 * | 8/2023 | Li .......................... | H04N 19/70 |
| | | | 375/240.02 |
| 11,954,736 B1 * | 4/2024 | Gross ............... | G06Q 30/0206 |
| 12,112,387 B2 * | 10/2024 | Gross ................... | G06Q 50/40 |
| 2006/0053038 A1 * | 3/2006 | Warren ................ | G06Q 40/08 |
| | | | 705/4 |
| 2009/0210302 A1 | 8/2009 | Tashev et al. | |
| 2010/0131304 A1 | 5/2010 | Collopy et al. | |
| 2011/0040579 A1 | 2/2011 | Havens | |
| 2012/0010906 A1 | 1/2012 | Foladare et al. | |
| 2012/0066007 A1 * | 3/2012 | Ferrick ................ | G06Q 40/08 |
| | | | 705/4 |
| 2012/0066077 A1 * | 3/2012 | Kingston ............. | G06Q 40/02 |
| | | | 705/16 |
| 2012/0101855 A1 * | 4/2012 | Collins ................ | G06Q 40/08 |
| | | | 705/4 |
| 2012/0209718 A1 | 8/2012 | Plut | |
| 2013/0006675 A1 * | 1/2013 | Bowne ................... | G01S 19/13 |
| | | | 705/4 |
| 2013/0282467 A1 | 10/2013 | Postrel | |
| 2013/0317736 A1 | 11/2013 | Fernandes et al. | |
| 2014/0095214 A1 | 4/2014 | Mathe et al. | |
| 2014/0095305 A1 | 4/2014 | Armitage et al. | |
| 2014/0108058 A1 | 4/2014 | Bourne et al. | |
| 2014/0257873 A1 * | 9/2014 | Hayward ............... | H04W 4/40 |
| | | | 705/4 |
| 2014/0310169 A1 | 10/2014 | Kacena | |
| 2015/0019265 A1 | 1/2015 | Roll et al. | |
| 2015/0039362 A1 | 2/2015 | Haque | |
| 2015/0081404 A1 | 3/2015 | Basir | |
| 2015/0088550 A1 * | 3/2015 | Bowers ................. | G06Q 40/08 |
| | | | 705/4 |
| 2015/0106132 A1 | 4/2015 | Johnson et al. | |
| 2015/0294422 A1 | 10/2015 | Carver et al. | |
| 2016/0086397 A1 | 3/2016 | Phillips | |
| 2016/0109251 A1 | 4/2016 | Thakur | |
| 2016/0189304 A1 * | 6/2016 | Todasco ................ | G06Q 40/08 |
| | | | 705/4 |
| 2016/0364679 A1 | 12/2016 | Cao | |
| 2017/0140293 A1 | 5/2017 | Vij et al. | |
| 2017/0220966 A1 | 8/2017 | Wang | |
| 2017/0255966 A1 | 9/2017 | Khoury | |
| 2017/0262770 A1 | 9/2017 | Purdy et al. | |
| 2017/0282930 A1 | 10/2017 | Kochhar et al. | |
| 2017/0308819 A1 * | 10/2017 | Liu ................... | G06Q 10/1093 |
| 2017/0344932 A1 | 11/2017 | Ahmadi | |
| 2017/0349089 A1 | 12/2017 | Fournier et al. | |
| 2017/0351987 A1 * | 12/2017 | Liu ................. | G06Q 10/06311 |
| 2017/0365007 A1 * | 12/2017 | Huls ........................ | H04W 4/40 |
| 2017/0372431 A1 * | 12/2017 | Perl ..................... | G06Q 10/047 |
| 2018/0025430 A1 * | 1/2018 | Perl ..................... | B60R 16/0231 |
| | | | 705/4 |
| 2018/0047107 A1 | 2/2018 | Perl et al. | |
| 2018/0075380 A1 * | 3/2018 | Perl ........................ | G06Q 50/40 |
| 2018/0089605 A1 | 3/2018 | Poornachandran et al. | |
| 2018/0130095 A1 * | 5/2018 | Khoury ............. | G01C 21/3617 |
| 2018/0237026 A1 | 8/2018 | Chowdhury et al. | |
| 2018/0342033 A1 | 11/2018 | Kislovskiy et al. | |
| 2019/0016343 A1 * | 1/2019 | Allen .................... | G08G 1/202 |
| 2019/0019122 A1 * | 1/2019 | Allen ................... | B60W 40/09 |
| 2019/0031097 A1 | 1/2019 | Michael | |
| 2019/0164229 A1 | 5/2019 | Sbianchi et al. | |
| 2019/0212159 A1 * | 7/2019 | Petersen ............. | G05D 1/0278 |

(56)             References Cited

U.S. PATENT DOCUMENTS

| | | | |
|---|---|---|---|
| 2019/0265948 A1 | 8/2019 | Goyal et al. | |
| 2019/0389483 A1 | 12/2019 | Likhterman et al. | |
| 2020/0074492 A1 | 3/2020 | Scholl et al. | |
| 2020/0086882 A1* | 3/2020 | Kodali | B60W 40/09 |
| 2020/0152067 A1 | 5/2020 | Salles et al. | |
| 2020/0160251 A1 | 5/2020 | Wynter et al. | |
| 2020/0226690 A1 | 7/2020 | Gulati et al. | |
| 2020/0278685 A1 | 9/2020 | Jang et al. | |
| 2021/0035224 A1* | 2/2021 | Crabtree | G06Q 10/067 |
| 2021/0049840 A1* | 2/2021 | Moghtadai | G06Q 40/08 |
| 2021/0097314 A1 | 4/2021 | Scanlon et al. | |
| 2021/0166322 A1 | 6/2021 | Allen et al. | |
| 2021/0166323 A1* | 6/2021 | Fields | G06V 20/58 |
| 2021/0256616 A1* | 8/2021 | Hayward | G06Q 40/08 |
| 2022/0036466 A1* | 2/2022 | Harvey | H04L 67/306 |
| 2022/0092893 A1 | 3/2022 | Rosenbaum | |
| 2022/0340148 A1 | 10/2022 | Rosenbaum | |

| | | |
|---|---|---|
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

He et al., "Profiling Driver Behavior for Personalized Insurance Pricing and Maximal Profit", 2018 IEEE International Conference on Big Data (Big Data), 2018, pp. 1387-1396 (Year: 2018).

Scola, "The Black Car Company That People Love to Hate: Cab Industry Be Warned, Uber has Entered the System," Forefront Next City, Inc. Nov. 11, 2013 (Year: 2013).

* cited by examiner

500

502

RECEIVE ENVIRONMENT DATA

504

DETERMINE A LEVEL OF DEMAND INCLUDING INCREASED PAYMENT OFFERS TO DRIVERS

506

RETRIEVE DRIVER DATA

508

GENERATE AN OPTIMAL PRICING MODEL BASED ON THE DATA

510

EXECUTE THE PRICING MODEL

512

DETERMINE AN INSURANCE PRODUCT OFFERING

514

TRANSMIT THE INSURANCE PRODUCT OFFERING AND THE INCREASED PAYMENT OFFERS TO A DRIVER

900

902
RETRIEVE DRIVER DATA

904
RETRIEVE RATINGS DATA

906
RETRIEVE TELEMATICS DATA

908
ANALYZE THE DATA SETS

910
GENERATE AN OVERLAID PRICING MODEL

912
EXECUTE THE OVERLAID PRICING MODEL

914
DETERMINE AN OPTIMAL INSURANCE PRODUCT

916
TRANSMIT THE OPTIMAL INSURANCE PRODUCT TO THE DRIVER

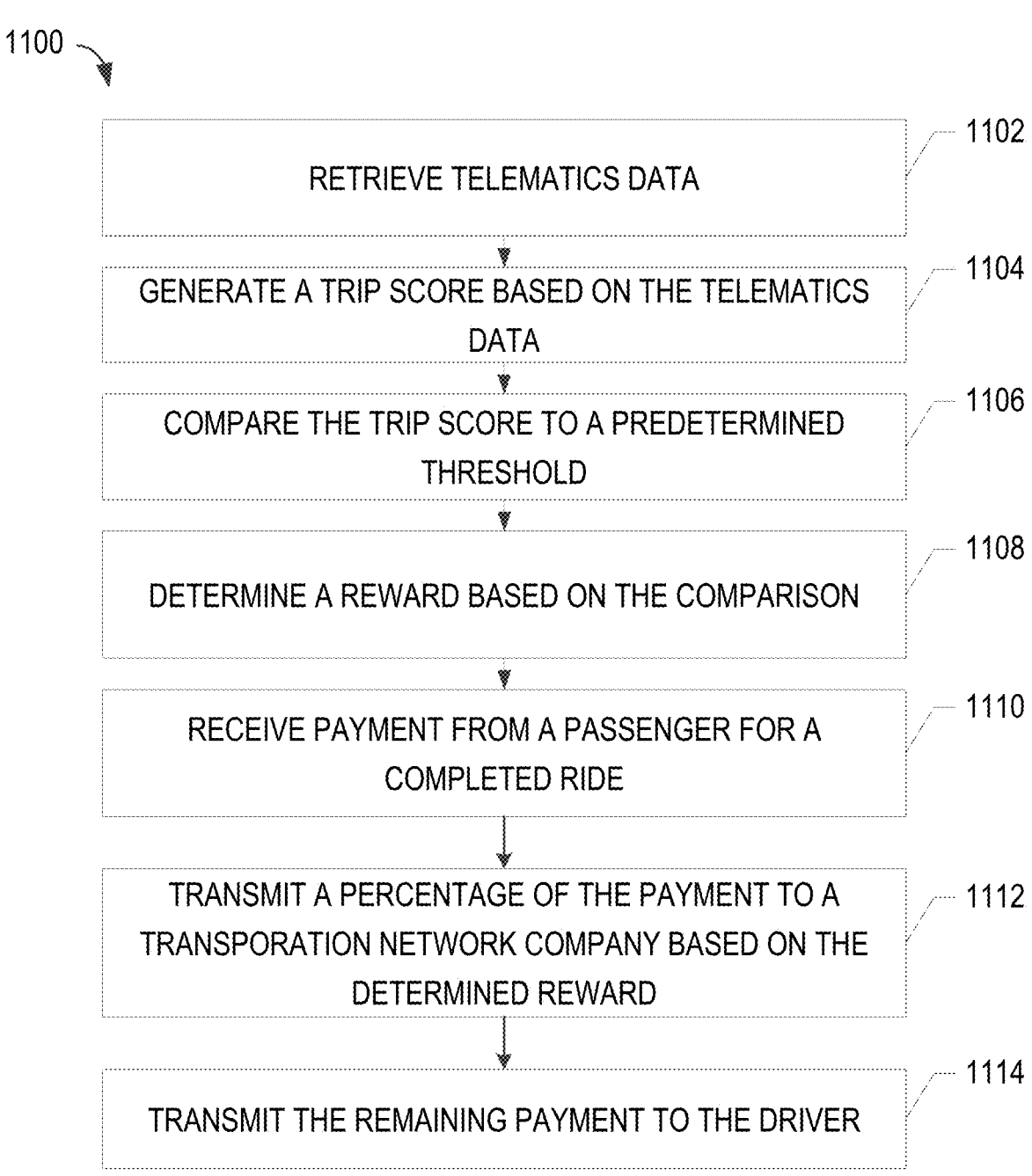

1100

RETRIEVE TELEMATICS DATA — 1102

GENERATE A TRIP SCORE BASED ON THE TELEMATICS DATA — 1104

COMPARE THE TRIP SCORE TO A PREDETERMINED THRESHOLD — 1106

DETERMINE A REWARD BASED ON THE COMPARISON — 1108

RECEIVE PAYMENT FROM A PASSENGER FOR A COMPLETED RIDE — 1110

TRANSMIT A PERCENTAGE OF THE PAYMENT TO A TRANSPORATION NETWORK COMPANY BASED ON THE DETERMINED REWARD — 1112

TRANSMIT THE REMAINING PAYMENT TO THE DRIVER — 1114

Figure 11

SYSTEMS AND METHODS FOR GENERATING MOBILITY INSURANCE PRODUCTS USING RIDE-SHARING TELEMATICS DATA

CROSS-REFERENCE TO RELATED APPLICATIONS

This application is a continuation application of U.S. patent application Ser. No. 18/331,760, filed Jun. 8, 2023, entitled "SYSTEMS AND METHODS FOR GENERATING MOBILITY INSURANCE PRODUCTS USING RIDE-SHARING TELEMATICS DATA," which is a continuation application of U.S. patent application Ser. No. 16/780,634, filed Feb. 3, 2020, entitled "SYSTEMS AND METHODS FOR GENERATING MOBILITY INSURANCE PRODUCTS USING RIDE-SHARING TELEMATICS DATA," which claims the benefit of priority to U.S. Provisional Patent Application No. 62/892,853, filed Aug. 28, 2019, entitled "SYSTEMS AND METHODS FOR GENERATING IMPROVED VEHICLE USAGE ANALYTICS BASED UPON VEHICLE SENSOR AND TELEMATICS DATA", and to U.S. Provisional Patent Application No. 62/892,916, filed Aug. 28, 2019, entitled "SYSTEMS AND METHODS FOR GENERATING MOBILITY INSURANCE PRODUCTS USING RIDE-SHARING TELEMATICS DATA", and to U.S. Provisional Application No. 62/934,932, filed Nov. 13, 2019, entitled "SYSTEMS AND METHODS FOR GENERATING MOBILITY INSURANCE PRODUCTS USING RIDE-SHARING TELEMATICS DATA", and to U.S. Provisional Application No. 62/934,948, filed Nov. 13, 2019, entitled "SYSTEMS AND METHODS FOR GENERATING MOBILITY INSURANCE PRODUCTS USING RIDE-SHARING TELEMATICS DATA", the entire contents and disclosures of which are hereby incorporated by reference herein in their entirety.

FIELD OF THE DISCLOSURE

The present disclosure relates to systems and methods for analyzing dynamic transportation conditions including ride-sharing services, and more particularly, to systems and methods for determining optimal insurance coverage for a driver associated with a transportation network company based upon the dynamic transportation conditions.

BACKGROUND

Transportation network companies ("TNC"), such as UBER and LYFT, enable efficient transportation of passengers by providing "ride-sharing" systems that allow independent operators (e.g., drivers) the ability to offer transportation services to riders seeking transportation.

Ride-sharing systems may use dynamic pricing models based upon passenger demand and the current supply of vehicles and drivers to determine a market rate. A higher price may be used to encourage drivers to offer rides during high demand or "peak" times when passenger demand is high and low driver supply occurs. By allowing drivers the ability to easily offer or discontinue transportation services, the demand for transportation may be more efficiently met by automatically adjusting the total number of vehicles in operation according to the number of passengers seeking transportation. Prices for transportation services using a flexible model may therefore be lower than if a fixed fleet of vehicles and drivers were deployed.

Independent operators driving for a TNC may be incentivized to offer services to riders through a number of benefits offered by the TNC including flexible scheduling, freedom from substantial oversight, and potential for significant compensation in highly trafficked areas. However, these incentives may not be sufficient to motivate an adequate number of drivers.

Drivers face a number of other difficulties that may deter offering transportation services. For example, driving during peak times may be extremely stressful when dealing with congested traffic conditions. In addition, offering driving services during peak times may also increase the possibility of accidents. Operating a vehicle in highly trafficked areas may also incur added maintenance costs further deterring drivers from offering such transportation services. Enhancing peace of mind and/or providing additional incentives may be desirable to encourage independent operators to offer these TNC transportation services.

BRIEF SUMMARY

The present embodiments may relate to systems and methods for enhancing dynamic allocation of transportation services by improving ease of access to personalized insurance protection and rewards-based instruments. The system may include a personalized insurance ("PI") computing device in communication with one or more transportation network companies ("TNC"), one or more financial service providers, one or more user computing devices, and/or one or more databases.

In one aspect, a personalized insurance ("PI") computing device may be provided. The PI computing device may be configured to determine an optimal usage-based insurance ("UBI") product for a driver operating a vehicle for a transportation network company ("TNC") during a period of increased demand for transportation services. The PI computing device may have at least one processor (and/or associated transceiver) in communication with at least one memory. The processor and/or associated transceiver may be configured to receive, from the TNC, data indicating the increased demand for transportation services. The processor may further be configured to retrieve driver data for a driver operating a vehicle for the transportation network company, wherein the driver data includes at least the driver history. The processor may be further configured to generate an optimal pricing model for the driver based upon the increased demand and the driver data. The processor may be further configured to execute the model to determine an optimal insurance product, where the optimal insurance product includes characteristics reflecting at least one risk factor associated with the increased demand for transportation services and a risk profile determined from analyzing the driver data. The processor and/or associated transceiver may be further configured to transmit, to a user computing device, an offer, to the driver, to provide transportation services at an increased earnings rate and with the determined optimal insurance product. The PI computing device may be configured to perform additional, less, or alternate functionality, including that discussed elsewhere herein.

In another aspect, a computer-implemented method for determining an optimal usage-based insurance ("UBI") product for a driver operating a vehicle for a transportation network company ("TNC") during a period of increased demand for transportation services using a personal insurance ("PI") computing device may be provided. The PI computing device may have at least one processor (and/or associated transceiver) in communication with at least one memory. The method may include receiving, via the processor and/or associated transceiver (such as via wireless communication or data transmission over one or more radio frequency links), data from the TNC indicating an increased demand for transportation services. The method may further include retrieving, via the processor, driver data for a driver operating a vehicle for the TNC, where the driver data includes at least the driver history. The method may further include generating, via the processor, an optimal pricing model for the driver based upon the increased demand and the driver data. The method may further include executing, via the processor, the model to determine an optimal insurance product, where the optimal insurance product includes characteristics reflecting at least one risk factor associated with the increased demand for transportation services and a risk profile determined from analyzing the driver data. The method may further include transmitting, via the processor and/or transceiver (such as via wireless communication or data transmission over one or more radio frequency links), to a user computing device, an offer, to the driver, to provide transportation services at an increased earnings rate and with the determined optimal insurance product. The method may include additional, less, or alternate functionality, including that discussed elsewhere herein.

In another aspect, a non-transitory computer-readable storage media having computer-executable instructions embodied thereon may be provided. When the computer-executable instructions are executed by a personalized insurance ("PI") computing device having at least one processor (and/or associated transceiver) in communication with at least one memory, the computer-executable instructions may cause the at least one processor and/or associated transceiver to receive, from a transportation network company ("TNC"), data indicating an increased demand for transportation services. The computer-executable instructions may also cause the at least one processor to retrieve driver data for a driver operating a vehicle for the TNC, where the driver data includes at least the driver history. The computer-executable instructions may further cause the at least one processor to generate an optimal pricing model for the driver based upon the increased demand and the driver data. The computer-executable instructions may also cause the at least one processor to execute the model to determine an optimal insurance product where the optimal insurance product includes characteristics reflecting at least one risk factor associated with the increased demand for transportation services and a risk profile determined from analyzing the driver data. The computer-executable instructions may further cause the at least one processor and/or associated transceiver to transmit, to a user computing device, an offer, to the driver, to provide transportation services at an increased earnings rate and with the determined optimal insurance product. The instructions may direct additional, less, or alternate functionality, including that discussed elsewhere herein.

In yet another aspect, a personalized insurance ("PI") computing device for facilitating automatic insurance payments through a hybrid savings account ("HSA") associated with a driver operating a vehicle for a transportation network company ("TNC") may be provided. The PI computing device may have at least one processor (and/or associated transceiver) in communication with at least one memory. The processor and/or associated transceiver may be configured to receive, from the TNC, funds earned by a driver operating the vehicle for the TNC. The processor and/or associated transceiver may also be configured to transmit the funds to a financial institution to be deposited into the HSA associated with the driver. The processor and/or associated transceiver may be further configured to receive, from a user computing device associated with the driver, a signal indicating (i) initiation of a ride for a passenger, and (ii) a request for insurance coverage for the ride. The processor and/or associated transceiver may also be configured to transfer, from the HSA to an insurance provider, payment for the requested insurance coverage. The PI computing device may be configured to perform additional, less, or alternate functionality, including that discussed elsewhere herein.

In a further aspect, a computer-implemented method for facilitating automatic insurance payments through a hybrid savings account ("HSA") associated with a driver operating a vehicle for a transportation network company ("TNC") using a personal insurance ("PI") computing device may be provided. The PI computing device may have at least one processor (and/or associated transceiver) in communication with at least one memory. The method may include, via the processor and/or associated transceiver, receiving, from the TNC, funds earned by a driver operating the vehicle for the TNC. The method may also include transmitting, via the processor and/or associated transceiver, the funds to a financial institution to be deposited into the hybrid savings account associated with the driver. The method may further include receiving, via the processor and/or associated transceiver, from a user computing device associated with the driver, a signal indicating (i) initiation of a ride for a passenger, and (ii) a request for insurance coverage for the ride. The method may also include transferring, via the processor and/or associated transceiver, from the hybrid savings account to an insurance provider, payment for the requested insurance coverage. The method may include additional, less, or alternate functionality, including that discussed elsewhere herein.

In another aspect, a non-transitory computer-readable storage media having computer-executable instructions embodied thereon may be provided. When the computer-executable instructions are executed by a personalized insurance ("PI") computing device having at least one processor (and/or associated transceiver) in communication with at least one memory, the computer-executable instructions may cause the at least one processor and/or associated transceiver to receive, from a transportation network company ("TNC"), funds earned by a driver operating a vehicle for the TNC. The computer-executable instructions may further cause the at least one processor and/or associated transceiver to transmit the funds to a financial institution to be deposited into a hybrid savings account ("HSA") associated with the driver. The computer-executable instructions may further cause the at least one processor and/or associated transceiver to receive, from a user computing device associated with the driver, a signal indicating (i) initiation of a ride for a passenger, and (ii) a request for insurance coverage for the ride. The computer-executable instructions may further cause the at least one processor and/or associated transceiver to transfer, from the HSA to an insurance provider, payment for the requested insurance coverage. The instructions may direct additional, less, or alternate functionality, including that discussed elsewhere herein.

In another aspect, the PI computing device may determine a ratings-based insurance product for a driver of a transportation network company ("TNC") operating a vehicle for the TNC. The PI computing device may have at least one processor (and/or associated transceiver) in communication with at least one memory. The processor may also be configured to retrieve ratings for a driver. The processor may be further configured to generate a risk model for the driver based upon the ratings. The processor may be further configured to execute the model to determine an optimal insurance product. The processor and/or associated transceiver may also be configured to transmit the optimal insurance product to the driver. The PI computing device may be configured to perform additional, less, or alternate functionality, including that discussed elsewhere herein.

In yet another aspect, a computer-implemented method for determining a ratings-based insurance product for a driver of a transportation network company operating a vehicle for the transportation network company may be provided. The method may be implemented using a personalized insurance ("PI") computing device. The PI computing device may have at least one processor (and/or associated transceiver) in communication with at least one memory. The method may include retrieving, via the processor, ratings for a driver. The method may further include generating, via the processor, a risk model for the driver based upon the ratings. The method may also include generating, via the processor, a risk model for the driver based upon the ratings executing the model to determine an optimal insurance product. The method may further include generating, via the processor, a risk model for the driver based upon the ratings transmitting the optimal insurance product to the driver. The method may include additional, less, or alternate functionality, including that discussed elsewhere herein.

In another aspect, a non-transitory computer-readable storage media having computer-executable instructions embodied thereon may be provided. When executed by a personalized insurance ("PI") computing device having at least one processor (and/or associated transceiver) in communication with at least one memory, the computer-executable instructions may cause the at least one processor to retrieve ratings for a driver. The computer-executable instructions may also cause the at least one processor to generate a risk model for the driver based upon the ratings. The computer-executable instructions may also cause the at least one processor to execute the model to determine an optimal insurance product. The computer-executable instructions may also cause the at least one processor and/or associated transceiver to transmit the optimal insurance product to the driver. The instructions may direct additional, less, or alternate functionality, including that discussed elsewhere herein.

In yet another aspect, a personalized insurance ("PI") computing device for generating an incentive for a driver operating a vehicle for a transportation network company may be provided. The PI computing device may have at least one processor (and/or associated transceiver) in communication with at least one memory. The processor and/or associated transceiver may be configured to receive, from a maintenance network, maintenance data for a vehicle associated with the driver. The processor may also be configured to analyze the maintenance data to determine a level of maintenance of the vehicle. The processor may also be configured to generate a reward (such as a discount) for the driver based upon the level of maintenance of the vehicle. The PI computing device may be configured to perform additional, less, or alternate functionality, including that discussed elsewhere herein.

In another aspect, a computer-implemented method for generating an incentive for a driver operating a vehicle for a transportation network company may be provided. The method may be implemented using a personalized insurance ("PI") computing device. The PI computing device may have at least one processor (and/or associated transceiver) in communication with at least one memory. The method may include receiving, via the processor and/or associated transceiver, maintenance data from a maintenance network for a vehicle associated with the driver. The method may further include analyzing, via the processor, the maintenance data to determine a level of maintenance of the vehicle. The method may further include generating, via the processor, a reward (such as a discount) for the driver based upon the level of maintenance of the vehicle. The method may include additional, less, or alternate functionality, including that discussed elsewhere herein.

In another aspect, a non-transitory computer-readable storage media having computer-executable instructions embodied thereon may be provided. When executed by a personalized insurance ("PI") computing device having at least one processor (and/or associated transceiver) in communication with at least one memory, the computer-executable instructions may cause the at least one processor and/or associated transceiver to receive, from a maintenance network, maintenance data for a vehicle associated with the driver. The computer-executable instructions may further cause the at least one processor to analyze the maintenance data to determine a level of maintenance of the vehicle. The computer-executable instructions may further cause the at least one processor to generate a reward, such as a discount, for the driver based upon the level of maintenance of the vehicle. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

7

Figure 5:
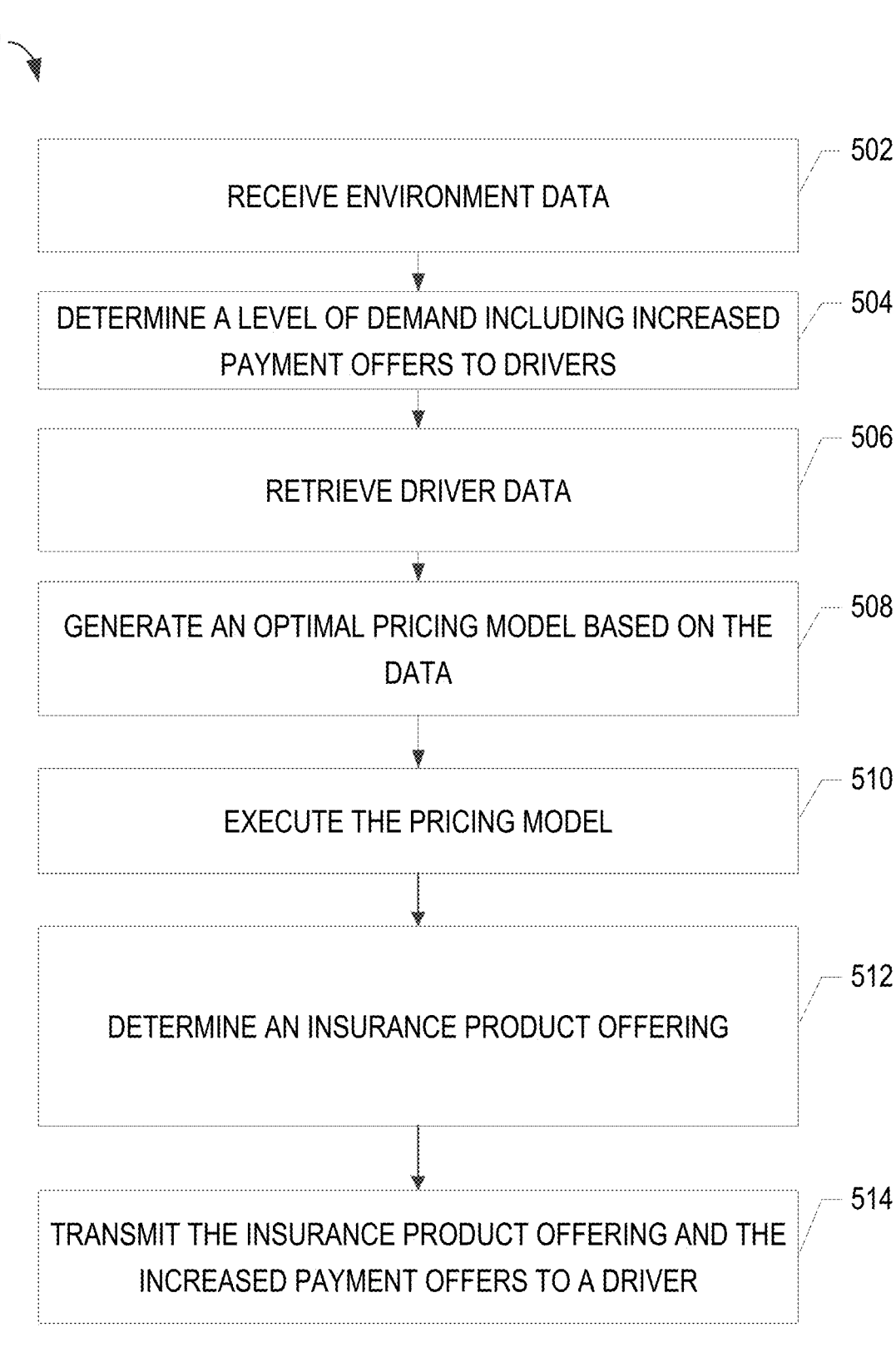
Figure 6:
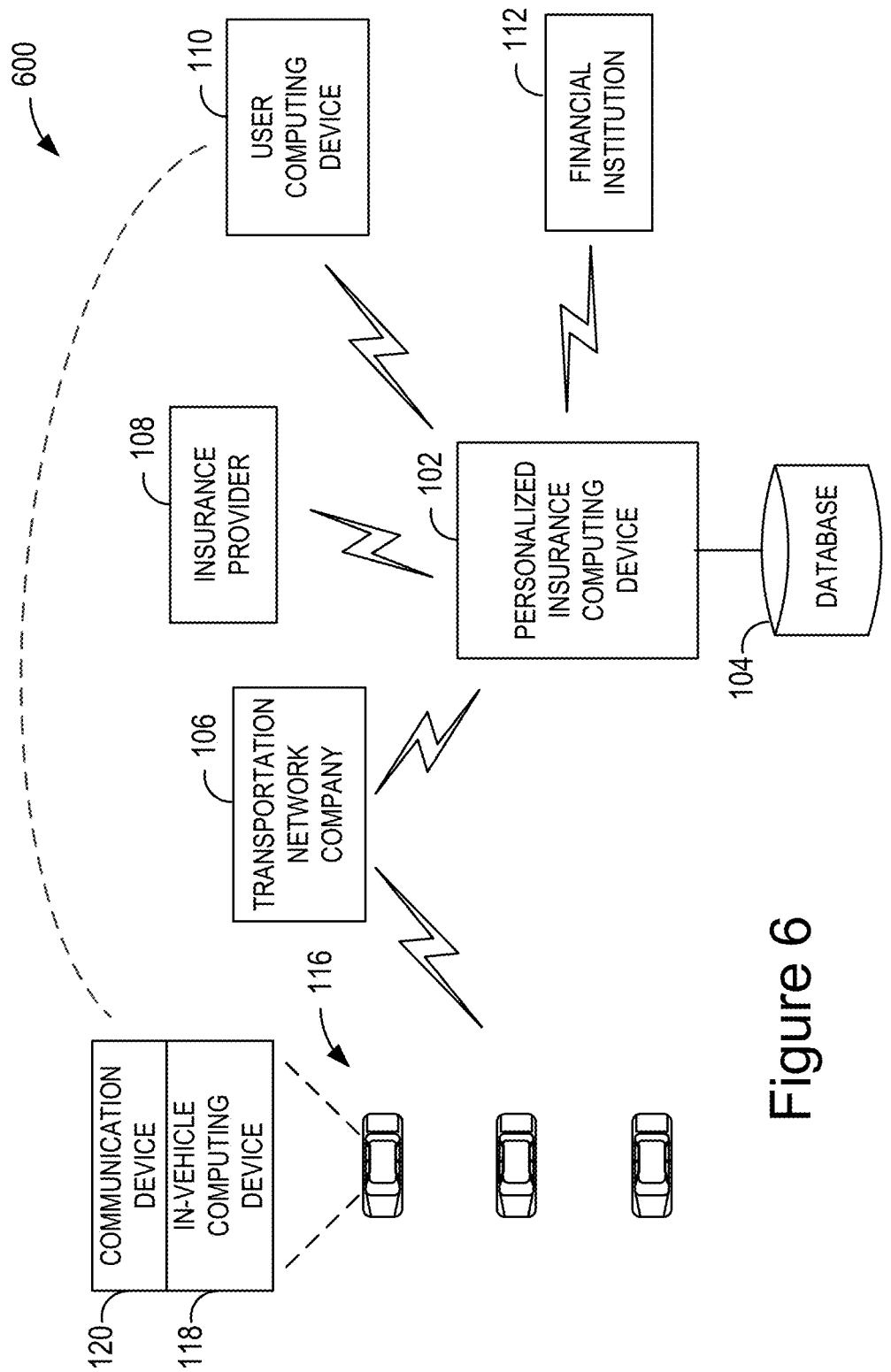
Figure 7:
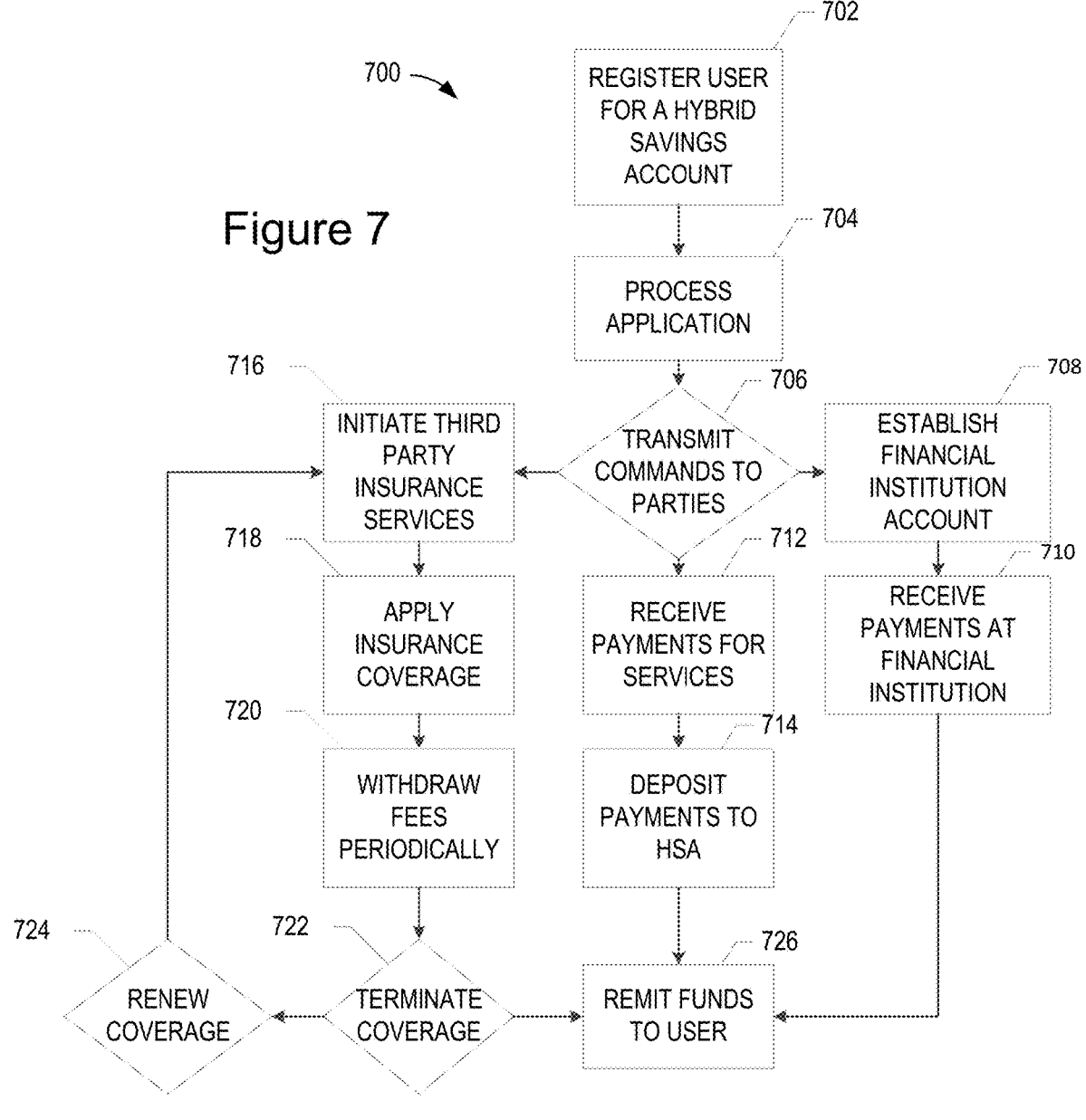
Figure 8:
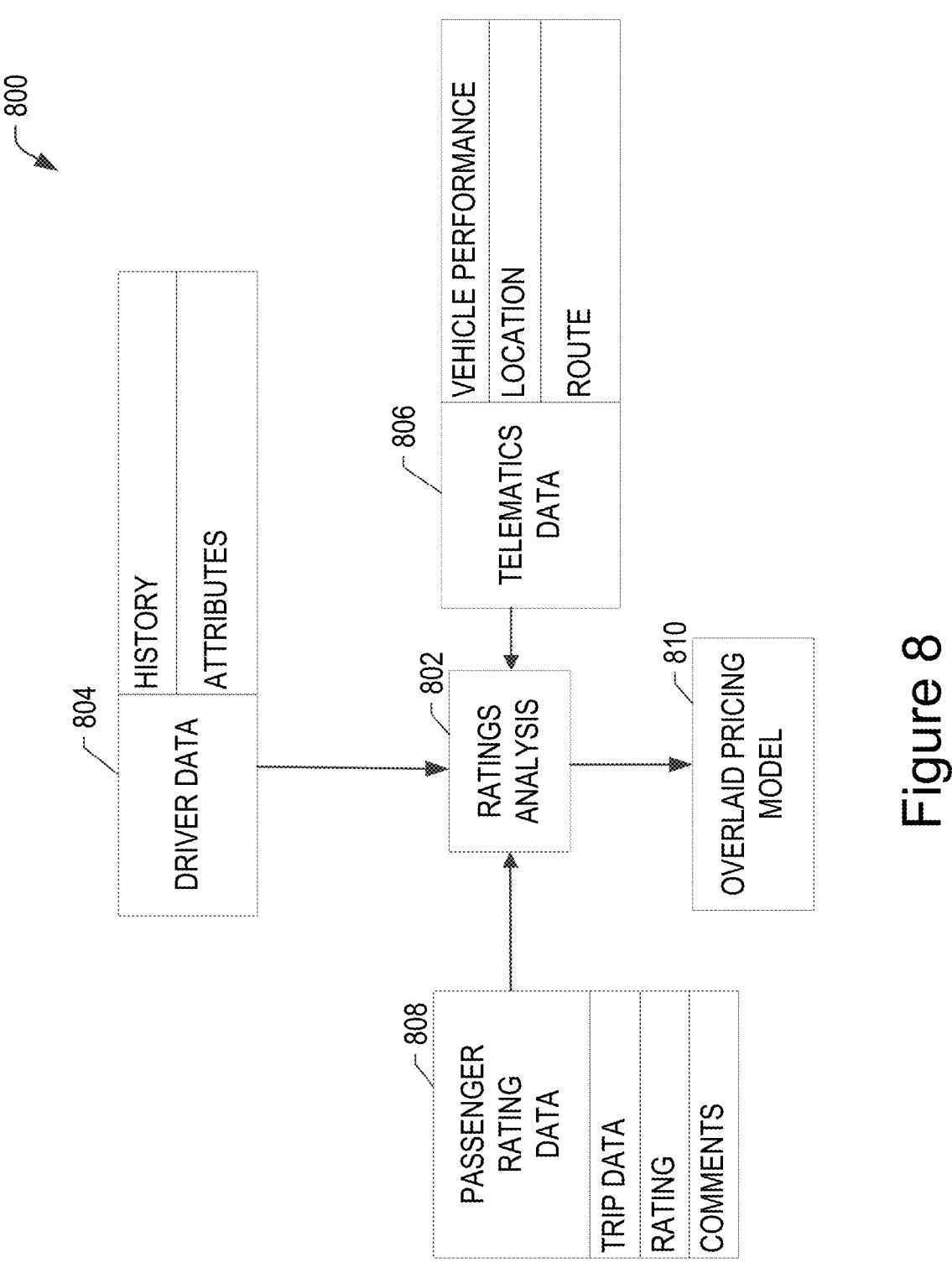
Figure 9:
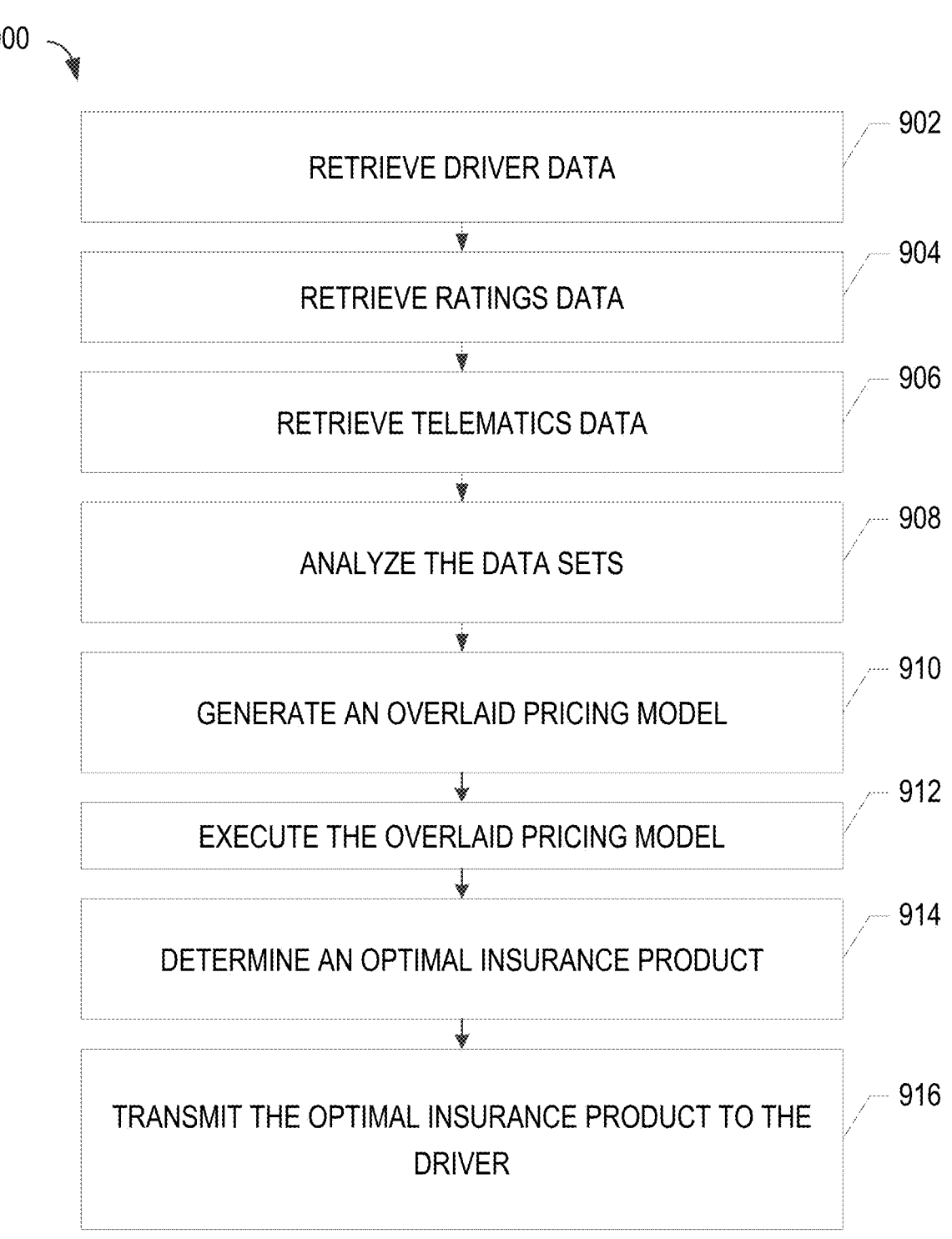
Figure 10:
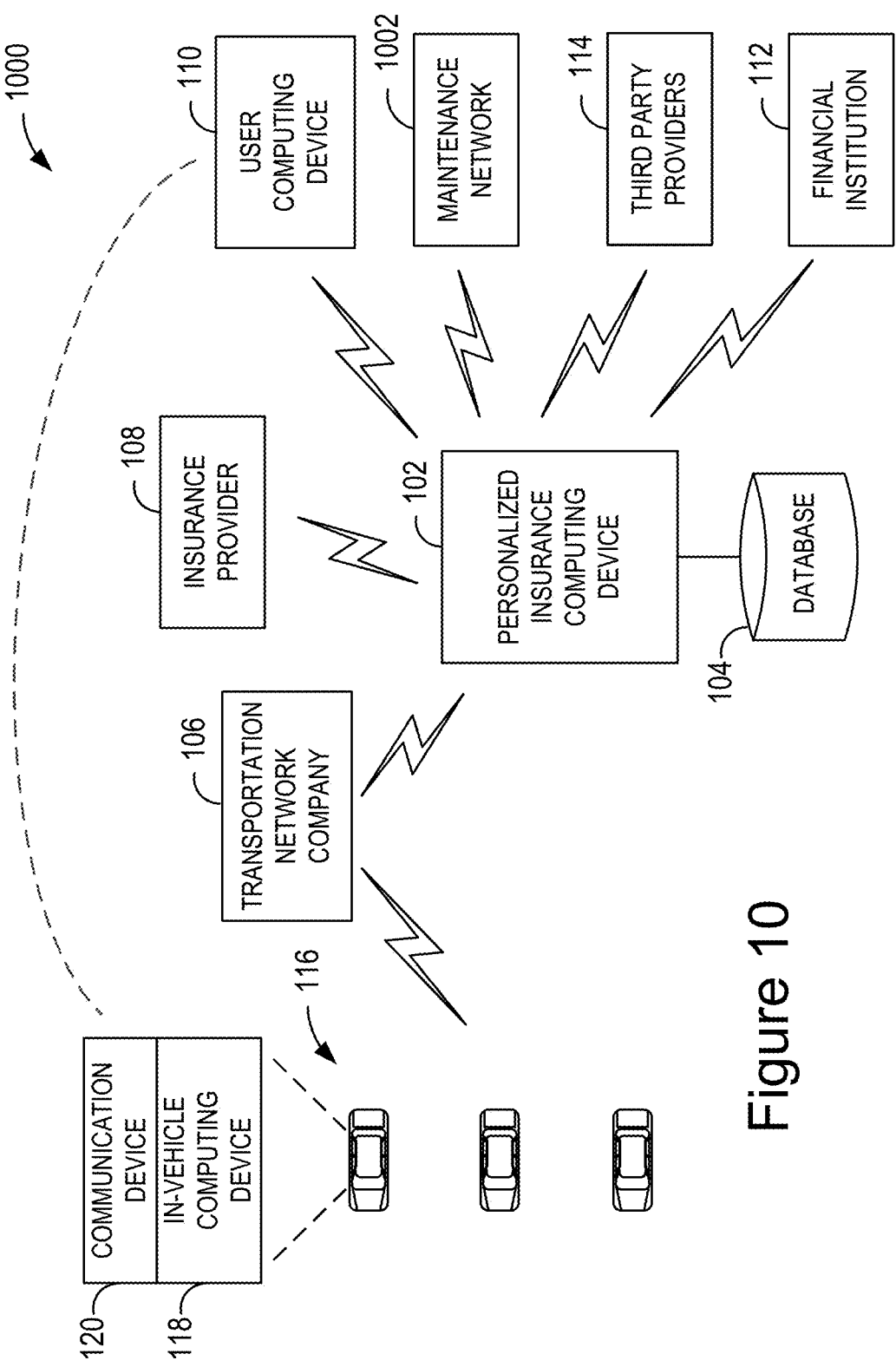
Figure 12:
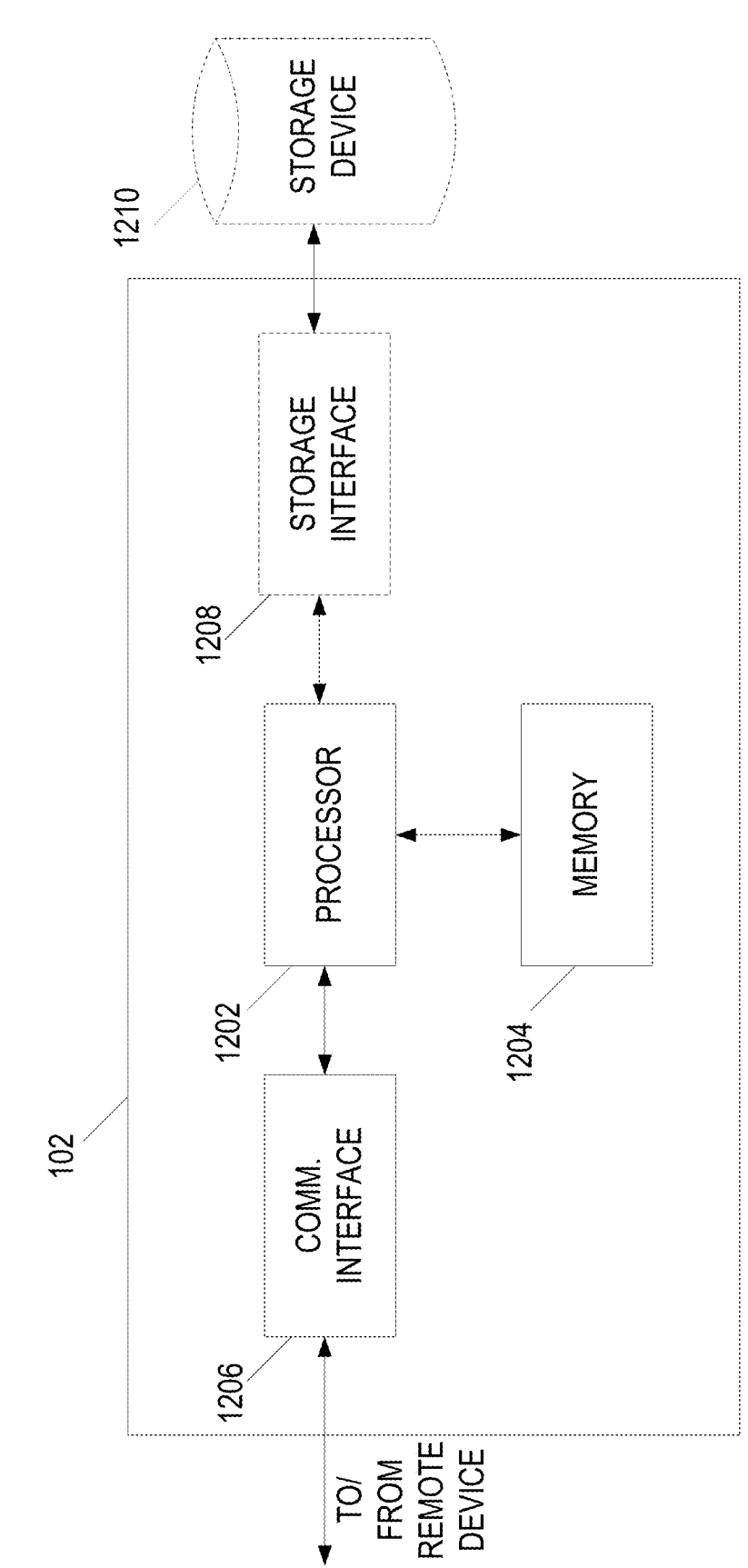
Figure 13:
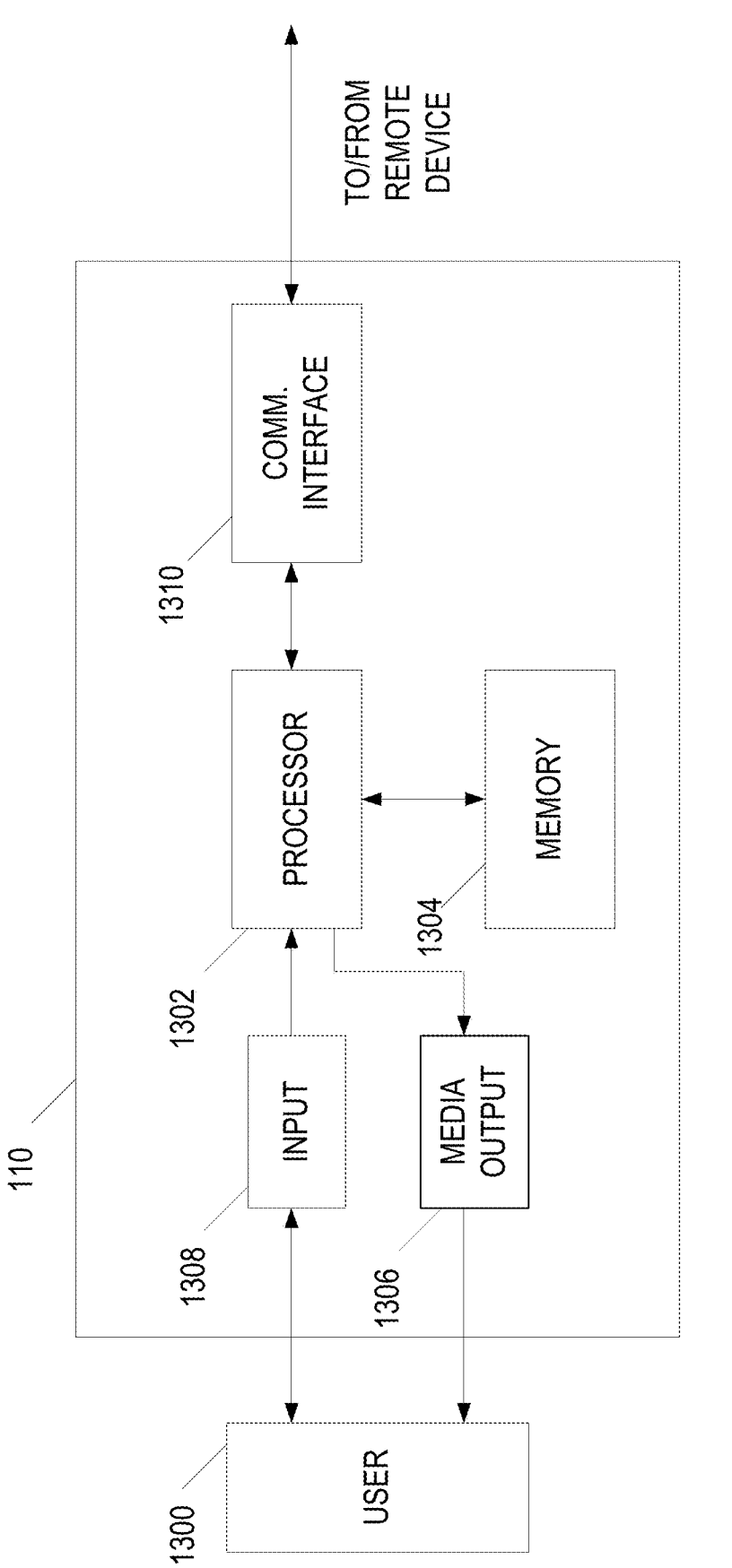

FIG. 5 illustrates a simplified block diagram of an exemplary process for determining and providing optimal insurance product offerings using a PI computer system;

FIG. 6 illustrates an exemplary diagram of a system implementing a hybrid savings account that may be used with a PI computer system;

FIG. 7 illustrates a flow chart of an exemplary computer-implemented process for operating a hybrid savings account in an exemplary system;

FIG. 8 illustrates a simplified block diagram of an exemplary data structure used when generating an exemplary overlaid pricing model for use with a PI computer system;

FIG. 9 illustrates a simplified block diagram of an exemplary process for generating an exemplary overlaid pricing model;

FIG. 10 illustrates an exemplary system for implementing rewards-based incentives for drivers of transportation network companies;

FIG. 11 illustrates a simplified block diagram of an exemplary process for implementing rewards-based incentives for drivers of transportation network companies;

FIG. 12 illustrates an exemplary personalized insurance computing device in a server configuration; and FIG. 13 illustrates an exemplary user computing device, in accordance with one embodiment of the present disclosure.

The Figures depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION OF THE DRAWINGS

The present embodiments may relate to, inter alia, systems and methods for providing easy access to guaranteed and personalized insurance products to encourage independent operators (e.g., drivers) to offer transportation services on behalf of a transportation network company ("TNC"). In particular, efficient insurance product offerings may be generated and offered through established financial accounts enabling immediate transaction completion and instantaneous delivery of insurance coverage. The insurance product offerings may include "usage-based" insurance ("UBI") products designed to provide coverage for targeted activities or predetermined periods of time.

UBI products may be precisely priced according to ratings or review-based underwriting models. In some embodiments, UBI products may be defined by specific time frames (e.g., one (1) month, one (1) week, one (1) day, one (1) hour, etc.). In some embodiments, real-time data received from TNCs may be used to dynamically generate insurance product offerings that accurately reflect fluctuating conditions in the environment such as sudden increases in demand or "peak" times. In some cases, inclement weather or other factors may influence accurate assessment of dangers or threats to safety which may also be considered. Other products, vendor agreements, discounts, or other rewards may be offered based upon safety evaluations and/or risk assessments of driving conditions and/or driver performance.

Obtaining the correct insurance coverage may, in some cases, be difficult for drivers preparing to embark on transportation services for a TNC. In some cases, the correct insurance product may not be offered when it is needed. For example, a driver planning to initiate transportation services at midnight on a weekend may be unable to locate and complete an insurance agreement. In some cases, applying for insurance may require 24 hours or more. In other cases, an application for insurance coverage may require human intervention and/or manual processing. In some cases, the process of acquiring insurance may also be a time-consuming task for drivers and may require inputting a great deal of information for evaluation by insurance providers.

At least some known insurance product offerings may be for the incorrect time frame. For example, if a driver merely needs additional protection for an evening, minimum insurance coverage options may be in excess of several days, weeks, or months. Further, the correct type of protection may not be available. For example, insurance providers may readily provide collision and liability insurance coverage, however, drivers operating vehicles for TNCs may require personal injury protection insurance and/or business liability insurance coverage. In some cases, acquiring greater liability coverage from insurance providers may require a lengthier application review that may not be accomplished in time to meet the driver's needs.

Completing a purchase transaction for insurance may also be difficult. For example, use of cash, payment cards, or other methods of payment may not be readily available. In other cases, drivers may face cash flow constraints. Executing a lump sum, up-front payment for insurance coverage may be difficult for some drivers. In some cases, insurance product offerings providing coverage over a period of time may offer a pre-paid payment schedule; however, these insurance products may present potential problems if drivers become unable to complete scheduled payment transactions over the insurance coverage period.

In addition to the problems a consumer may face, insurance providers may also face a number of difficulties in providing insurance for TNC drivers. In some cases, estimating the level of risks involved may be difficult. For example, a driver operating a vehicle for a TNC during peak times and in certain locations may require heightened coverage potentially requiring increased cost and/or prices. Without specific information about potential hazards, insurance products offered may be priced higher than necessary if drivers are operating in a relatively safe or low risk location.

Additionally, the type of vehicle may be a relevant factor when determining the actual cost of coverage. A well-maintained vehicle, for instance, may present fewer risks while an unmaintained vehicle may exhibit heightened brake failures or other hazardous issues. Further, the driver may pose certain risks that may not be accurately accounted for in an insurance product offering. For example, some drivers may be very risk averse drivers while others may be very aggressive, risk-taking drivers. Driving records may be difficult and costly to obtain and may not accurately reflect a driver's most recent driving habits. Other data, such as data from vehicle sensors, may be helpful in assessing risks, but may be limited and difficult to analyze.

Insurance providers must expend significant time and resources to evaluate as much information as possible to determine appropriate insurance product offerings that accurately reflect the risks involved. Retrieving and analyzing multiple sources of data may substantially increase the cost and price of insurance product offerings. In addition, rapidly changing conditions in the environment may result in incorrectly priced insurance instruments leading to insurance product offerings that may mismatch price to actual risk.

Further, determining the time frame in which insurance coverage is needed may be challenging. For example, a TNC driver may intend to operate during a sports event that may last a limited number of days; however, insurance providers may only offer conventional products for semi-annual or annual coverage.

Offering coverage periods for longer periods of time may not accurately reflect dynamic environmental conditions or circumstances. Conversely, insurance product offerings for shorter time frames such as a single (1) day may not accurately reflect the risks associated with highly trafficked events. For example, a coverage period of one (1) year may not effectively incorporate heightened risk factors for rapidly developing events such as inclement weather, social unrest, or other events. In other cases, if insurance is needed for a short period of time such as a week or day, the variance of sudden or aberrant events may dramatically increase the cost of providing insurance instruments.

To compensate for these situations, insurance providers may increase the price to consumers. Alternatively, insurance providers may offer on-demand or usage-based products. However, in these cases, insurance providers may have difficulty determining appropriate cost and/or pricing structures, in particular after an event has occurred. In some further cases, usage-based products may include an initial payment prior to coverage. In some cases, additional per-use fees may be applied. Discounts or refunds after the duration of the agreement has expired may be returned to the consumer. While this process may improve the efficiency of some insurance products through the higher initial payment and subsequent refund, significant risk may remain for the insurance provider. In addition, some consumers may find the system cumbersome.

Purchasing insurance coverage when driving for a TNC may be a cumbersome and time-consuming task. TNC drivers operating vehicles during peak times may not have the correct level and type of insurance coverage to drive in highly trafficked areas. In some cases, purchasing insurance may require substantial up-front costs. In other cases, insurance providers may risk potential drivers failing to timely pay for insurance coverage already provided. Further, insurance providers may not be able to easily determine accurate cost and pricing for insurance product offerings. These and other issues may deter independent operators from providing transportation and/or other services, and may deter TNCs from hiring more drivers to services riders.

Exemplary Real-Time Usage-Based Insurance

In one exemplary embodiment, real-time, usage-based insurance ("UBI") product offerings may be used to more efficiently and effectively accommodate rapidly changing (e.g., dynamic) conditions. For example, a transportation network company ("TNC") may periodically experience a higher demand (e.g., peak or surge times) for transportation services (e.g., rides). For example, during a sporting event increased traffic to the area may lead to an increase in demand for transportation services. To incentivize independent operators (e.g., drivers) to offer rides during peak times, prices may be raised to increase the pay rate to drivers. In some cases, a bonus may be provided for drivers operating during peak times. In some cases, the TNC may offer an increased pay rate (e.g., earnings rate), such as a percentage of the price offered.

In the above described scenarios, a driver driving for a TNC during peak times may wish to purchase or otherwise acquire additional protection for a short period of time. The driver may also intend to only offer transportation services (e.g., rides) during the peak time. After the event has concluded, the driver may wish to no longer offer rides and therefore may be only interested in insurance for a few hours. Such a driver may therefore be interested in a UBI product.

In the exemplary embodiment, a personalized insurance ("PI") computing device may be provided. The PI computing device may be in communication with an insurance service provider and/or a TNC. The PI computing device may also be in communication with a user computing device. The user computing device may be operated by a user (e.g., driver) for the TNC and configured to communicate with the TNC to coordinate, route, and otherwise provide ride-sharing services for and/or with the TNC. The PI computing device may receive and store driver data including preferences for offering transportation services such as time of day, location, and/or driving habits. The PI computing device may also receive market data from the TNC indicating current market supply and demand. The market data may be a continuous stream or may be periodic, discrete updates.

As an example, the driver may activate an app on a user computing device to begin offering rides to passengers. Using the app, the driver may select from any number of options including selecting a predetermined period of time for which the driver will offer rides. For example, the driver may select a three (3) hour period to offer rides. At the conclusion of the identified time period, the app may automatically disable any further transportation activities. The driver may optionally manually terminate ride services at any time via the user computing device. The driver may also be provided driving options including purchasing insurance products through the app on the user computing device.

The PI computing device may receive and store, from the TNC and/or remote or other third-party data sources, driver payment data or insurance provider payment data, incentives, bonuses, pricing increases, and/or other methods of encouraging or compensating suppliers or providers to offer services during times of high demand. In the exemplary embodiment, the PI computing device may determine a personalized insurance product offering for a specific driver based upon the market data and the supplier and/or provider compensation data. For example, the TNC may offer a 20% increase in payment to all TNC drivers operating during the peak time. During this period, the PI computing device may receive the 20% increase in payment and deduct 5% of the increase and offer the remaining 15% to the driver along with a UBI product.

In some embodiments, the TNC may be provided bulk or group discounts or other business partnership agreements to reduce the deduction. The PI computing device may then transmit the combined package offer to the driver. In some embodiments, the UBI product may be offered as an increase in coverage over existing insurance coverage, reduced deductibles, or improved features such as discounted or free vehicle rentals in the event of a disabling event. In some embodiments, variations of combinations of offers may be generated from the above described payments and incentives for selection and/or purchase by the driver.

Exemplary Hybrid Savings Account

In one exemplary embodiment, a hybrid savings account ("HSA") or "insurance savings plan" or "flex plan" may be used to fund the purchase of insurance products and/or other services (e.g., vehicle maintenance services). In particular, a user (e.g., a driver for a ride-share company or TNC seeking insurance coverage for operating a passenger vehicle for temporary commercial purposes) may establish an HSA at a financial institution associated with an insurance provider and/or in communication with an insurance provider. In the exemplary embodiment, the user registers for an HSA with the PI computing device. The user may use a user computing device to communicate with the PI computing device to input or upload personal information to the PI computing device.

In some embodiments, the HSA may be an account under full or partial control of the insurance provider. For example, the insurance provider may be authorized to deduct amounts from the HSA. In the exemplary embodiment, the HSA is administered by a financial institution in communication with the PI computing device where the PI computing device facilitates, coordinates, directs, manages, and/or otherwise determines appropriate transfer of funds from the user to and from the HSA and appropriate transfers of funds from the HSA to and from the insurance provider.

In the exemplary embodiment, the user may register with the PI or directly with the insurance provider to apply for and/or establish the HSA. In some embodiments, the insurance provider may host the PI computing device. In the exemplary embodiment, the PI computing device is a remote server in communication with the insurance provider and at least one financial institution offering the HSA services. In the exemplary embodiment, the PI computing device transmits instructions, code, commands, and other data to at least one insurance provider and at least one financial institution administrating the HSA. Data transmitted to the insurance provider may include at least registration information identifying the user applying for an insurance coverage product. Data transmitted to the financial institution may include at least similar identification information of the user.

Upon registration by the user (e.g., via an online portal, app, by phone, or in person) the PI computing device or insurance provider establishes the HSA with a financial institution. In some embodiments, a pre-determined selection of financial institutions may be offered by the insurance provider and presented by the PI computing device for selection by the user. Each financial institution may have a pre-arranged agreement with the insurance provider to act as a third party under a fiduciary obligation to safely and securely facilitate, manage, operate, or otherwise provide financial services consistent with the functionality of the HSA as described herein. In some embodiments, the user may independently apply for an HSA with a preferred financial institution and the preferred financial institution may then communicate with the PI computing device and/or directly with the insurance provider to establish the HSA.

In the exemplary embodiment, the user may make periodic deposits to the HSA but may not withdraw funds from the HSA for a predetermined period of time (e.g., the duration of the insurance coverage period or other pre-arranged or agreed upon period of time). In some embodiments, the user may dictate, direct, or otherwise determine a type of savings and/or investment plan for the funds held in the HSA. For example, the user may be provided a limited selection of financial investment options and may direct the funds held in the HSA to be invested in at least one of the provided investment options. In the exemplary embodiment, the user may direct funds held in the HSA for the purchase of certain insurance products offered by the insurance provider.

In the exemplary embodiment, the funds held in the HSA may be used to purchase or are otherwise applied to insurance products or services offered by the insurance provider. In one embodiment, an insurance product may provide coverage by travel distance (e.g., feet, miles, kilometers, etc.). For example, as the user travels, coverage may be provided on a per-mile basis and a corresponding cost or per-mile fee may be calculated and subsequently deducted or withdrawn from the HSA.

In other embodiments, per-use insurance coverage or UBI products, as described above, may be calculated by time, activity, participation, presence, location, or device. As another example, UBI may include coverage for use of TNC ride-hailing or ride-sharing services.

As the user requests and embarks on a ride, UBI coverage may be applied towards each ride undertaken and the corresponding UBI fee may be automatically deducted from the HSA. In some embodiments, the PI computing device may be used to facilitate ride-sharing services including receiving requests for rides, managing and/or coordinating TNC drivers, managing payment, and offering insurance products to the user and/or the driver. In some embodiments, the TNC may host the PI computing device.

In the exemplary embodiment, the PI computing device records and/or transmits each UBI-based transaction to the financial institution administrating the HSA for payment of UBI fees to the insurance provider. In some embodiments, a user computing device may be used to automatically and/or manually record and transmit each instance of use of UBI-based insurance coverage. For example, a TNC ride-sharing app may be used to both request TNC ride services while simultaneously transmitting a notification or otherwise communicating with the financial institution to deduct funds from the HSA and transfer the funds to the insurance provider. In some embodiments, the insurance provider receives the notification and withdraws funds from the HSA. In the exemplary embodiment, the PI computing device may record UBI-based transactions and additionally communicate with the financial institution administrating the HSA and the insurance provider.

Upon expiration of the insurance coverage period and/or termination of the insurance agreement, any excess and/or unused funds may be released or returned (e.g., refunded) to the user via a disbursement or by way of the insurance provider relinquishing control of the HSA, such as by a lifting or removal of the restrictions or limitations on the HSA. In the exemplary embodiment, the user may be provided with the option to renew or re-purchase the same or similar insurance product and/or purchase an entirely new or different insurance product using the remaining funds in the HSA. In some cases, the user may need to and/or wish to add funds to the HSA prior to acquiring or renewing insurance coverage.

In some embodiments, renewal (e.g., re-purchase) of the insurance product may be automatic. The user may be provided the option to disable (e.g., opt-out) or enable (e.g., opt-in) the automatic renewal. Renewal of the insurance coverage may include "rolling over" excess funds to the next coverage period whereby the excess funds are automatically applied to the purchase price of the insurance product offering. In some embodiments, insurance coverage may be automatically initiated, and any shortage or amount owed by the user may be requested from the user. For example, the user may be billed and/or notified of any shortage and prompted to deposit additional funds into the HSA.

In some embodiments, insurance coverage may not be initiated until sufficient funds are deposited into the HSA. In some embodiments, additional payment sources may be linked to the HSA (e.g., credit card, debit card, bank account, etc.) and funds may be authorized for withdrawal from the other sources so that insurance coverage does not lapse.

Exemplary Ratings-Based Model

In one exemplary embodiment, a ratings-based underwriting model may be used to generate personalized insurance product offerings. The PI computing device may generate a model to determine optimal pricing for consumers (e.g., passengers). In the exemplary embodiment, the PI computing device may be configured to receive passenger ratings from a passenger via a user computing device in communication with the PI computing device. In the exemplary embodiment, an app and/or an online interface configured to receive passenger input may receive a numerical score and/or a written description, narrative, and/or summary of the product or service (e.g., ride).

For example, the passenger may request a ride from the TNC using an app installed on a user computing device. Upon reaching the requested destination, the passenger may wish to review and/or rate the transportation services provided. Using the app and/or an online interface, the passenger may input and upload to the PI computing device a review of the provided service. The PI computing device may store the received review in a database. In the exemplary embodiment, the PI computing device may categorize, sort, parse, and/or otherwise process aggregated reviews using statistical analysis, machine learning, natural language processing, and/or other methods of analyzing comprehensive data sets.

In the exemplary embodiment, the review may include a numerical evaluation or rating of the product or service. Ratings may be aggregated across the same and/or similar products or service for analysis to determine a score. For example, a driver for a TNC may provider a number of rides to passengers over a day. Each passenger may rate the driver on any number of objective and/or subjective factors. For example, a passenger may rate the time take to reach the destination.

In some embodiments, objective measures of performance may be automatically recorded by, for example, a user computing device associated with the driver and/or measurement, computing, and transmitting devices installed on the vehicle. Subjective performance metrics may include, for example, the courtesy and conversation of the driver. If a driver is particularly helpful and informative, a passenger may provide a high rating for the driver.

In the exemplary embodiment, the PI computing device uses aggregated ratings as at least one factor of a risk assessment model for a particular product or service. For example, passenger reviews of a particular type of vehicle may be factored into the model. A vehicle reviewed by drivers, passengers, and/or industry experts as a safe vehicle may reduce the insurance price to operators of the vehicle. In some embodiments, ratings and reviews from agencies, organizations, and governments (e.g., U.S. Department of Transportation) may be also used to generate the risk assessment model.

In the exemplary embodiment, the PI computing device may be in communication with a TNC computing device configured to transmit passenger ratings to the PI computing device. The PI computing device updates the risk assessment model associated with the TNC driver that receives a passenger rating.

In the exemplary embodiment, the PI computing device may combine or overlay passenger ratings with additional data relevant to the product or service. For example, for a TNC driver review, the requested ride may have occurred along a route in a specific geographic area. Certain geographic areas known to be safer (e.g., areas having fewer incidents leading to insurance claims) may be factored into the model, and thereby allow for reduced insurance product pricing or other insurance-cost savings.

In addition to location-based data, incident-based or claims-based analysis may be applied towards other products and services. For example, vehicle types receiving fewer insurance claims may be factored into the model to determine that operation of that vehicle type may permit reduced and/or discounted insurance product pricing. The PI computing device may retrieve data from multiple sources such as ride data (e.g., from onboard computers, ride-sharing app APIs, etc.), location data (e.g., GPS, mapping, etc.), telematics data (e.g., accelerating, breaking, and cornering data from the vehicle), app or online ratings, and may combine the data to generate a dynamic model to easily and efficiently determine precise user profiles and optimized product pricing.

Exemplary Rewards-Based Incentives System

In one exemplary embodiment, rewards-based insurance product offerings may be used to incentivize drivers to offer transportation services for a TNC by providing personalized rewards to drivers. In some cases, the TNC may retain a portion (e.g., cut) of the total price paid by a passenger for a ride.

In the exemplary embodiment, the PI computing device may be provided. The PI computing device may be configured to receive telematics data, generate a trip score and/or a driver score, and determine a corresponding reward based upon the generated score. In the exemplary embodiment, the trip and/or driver score may be determined based upon safe driving, or risk averse driving. For example, a rules-based algorithm may be applied to the received telematics data. The received telematics data may be processed (e.g., by categorizing, inserting into a database, establishing database relationships, etc.) and compared to predetermined thresholds to determine whether a trip and/or a driver is above or below a threshold or series of thresholds.

For example, if the telematics data is evaluated and determined to be above a first threshold (e.g., a very safe driver or risk averse driver), the PI computing device may transmit to the associated TNC, a partial refund or discount of the TNC portion for the trip thereby enabling the driver to receive higher earnings for the trip. The refund or discount may be processed by, for example, a payment transaction initiated by the PI computing device causing an associated insurance provider (or another third-party) to transmit the determined funds to the TNC. If the telematics data is evaluated and determined to be above a second threshold (e.g., indicating an extremely safe driver), the refund or discount may be for a full amount of the TNC portion.

Thresholds may be a statistical measure determined from relevant environmental and aggregated driver data from a history of all drivers in a geographic area. For example, if a driver is driving at the speed limit for the road and is within the lane by more than 50 percent of all other drivers, the driver may be above the first threshold and may receive benefits associated with being above the threshold. In some embodiments, the refund or discount may be deposited into a hybrid savings account as described above. In some embodiments, cash may be deposited at a financial institution of the driver.

In some embodiments, the PI computing device may be configured to offer third-party discounts and/or rewards. For example, to reduce the cost of maintaining a vehicle used for ridesharing, discounted or free maintenance may be offered to the driver in lieu of cash back or higher pay rates with the TNC, and/or a combination of rewards may be offered to the driver. In some embodiments, the PI computing device may be in communication with a network of preferred maintenance providers. The network of preferred providers may offer a wider array of maintenance and repair options.

In some embodiments, the network of preferred maintenance providers may establish a business partnership with other entities such as the insurance provider and/or the financial institutions associated with the driver. Group or collective discounts and/or combinations of rewards may be generated to incentivize drivers. In the exemplary embodiment, the network of preferred maintenance providers may transmit to the PI computing device periodic or continuous updates on maintenance activities undertaken by vehicles operating for the TNC. Well-maintained vehicles may receive additional discounts and/or other rewards to further incentivize safe vehicle operation.

In some embodiments, the PI computing device may be in communication with a financial institution and may transmit to the financial institution a command to establish a specialized vehicle replacement savings account. The vehicle replacement account may be designed to accumulate funds for the purchase of a new vehicle when maintenance fees on an older vehicle used for TNC driving. In some embodiments, the PI computing device may direct refunds and discounts into the vehicle replacement savings account. In some embodiments, the driver may also initiate transactions to independently deposit funds into the account. Third parties such as an insurance provider and/or a vehicle manufacturer may additionally deposit matching funds into the account to assist in facilitating the purchase of a replacement vehicle for TNC driving.

Accordingly, the systems and methods described herein address at least these problems. Specifically, the systems and methods described herein may be implemented using computer programming or engineering techniques including computer software, firmware, hardware, or any combination or subset thereof, wherein the technical effects may be achieved by performing at least one of the following steps: (i) receiving, from a transportation network company, data indicating an increased demand for transportation services, (ii) retrieving driver data for a driver operating a vehicle for the transportation network company, wherein the driver data includes at least the driver history, (iii) generating an optimal pricing model for the driver based upon the increased demand and the driver data, (iv) executing the model to determine an optimal insurance product, wherein the optimal insurance product includes characteristics reflecting the risks associated with the increased demand for transportation services and a risk profile determined from analyzing the driver data, (v) transmitting, to a user computing device, an offer to provide transportation services to passengers at an increased earnings rate and with the determined insurance product.

Exemplary technical effects of the systems, methods, and computer-readable media described herein may include, for example: (i) determining an optimally priced insurance products for drivers providing transportation services for transportation network companies during peak times; (ii) reducing the cost of providing insurance products to drivers through analysis of telematics data, environment data, and traffic data indicating peak times; (iii) providing efficient means for drivers to pay for the insurance product through associated hybrid savings accounts; (iv) providing protection to insurance providers against consumer default; (v) reducing the costs of generating driver risk profiles of drivers driving for transportation network companies through the use of ratings and telematics data; (vi) generating insurance discounts to encourage safer or risk averse driving behavior; (v) generating rewards based upon safe or risk averse driving habits; (vi) generating rewards to encourage regular vehicle maintenance; and/or (vii) providing incentive-based financial systems to encourage savings for replacement vehicles.

Exemplary System For Providing Real-Time Usage-Based Insurance

Figure 1:
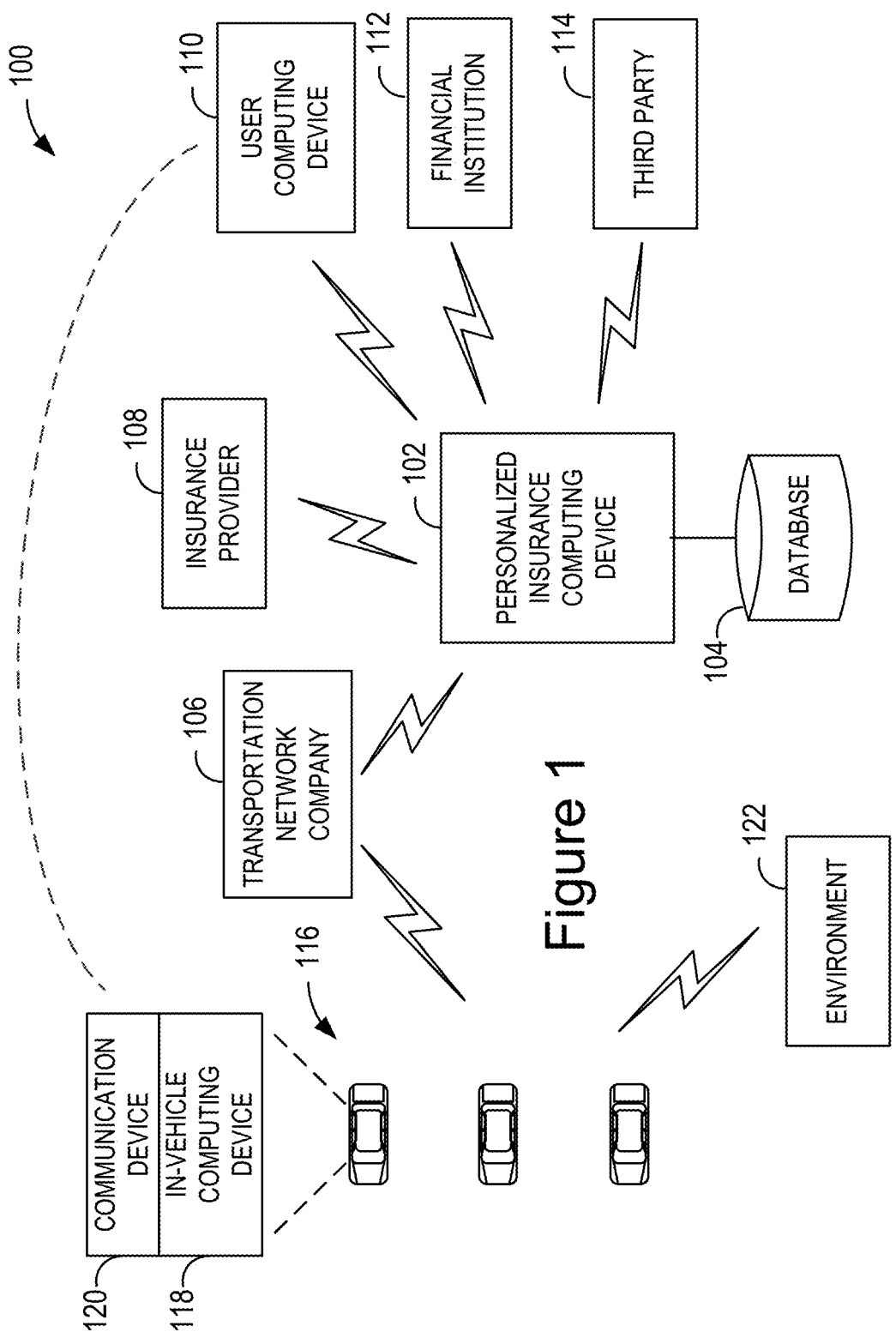
FIG. 1 illustrates an exemplary personal insurance ("PI") computer system including a PI computing device for providing real-time, usage-based insurance ("UBI"), responsive to dynamic conditions.

FIG. 1 illustrates an exemplary personalized insurance ("PI") computer system 100 including a PI computing device for providing real-time, usage-based insurance responsive to dynamic conditions. In the exemplary embodiment, system 100 includes a PI computing device 102. PI computing device 102 may be in communication with a database 104. PI computing device 102 may be in communication with a transportation network company ("TNC") 106, an insurance provider 108, a user computing device 110, a financial institution 112, and/or a third party 114, such as via wireless communication or data transmission over one or more radio frequency links.

In the exemplary embodiment, TNC may be in communication with at least one vehicle 116 used for providing transportation services ("rides") for passengers. Vehicle 116 may include an in-vehicle computing device 118. In-vehicle computing device 118 may include a communication device 120. Communication device 120 may be used to communicate with user computing device 110. In the exemplary embodiment, vehicle 116 may include sensors (not shown) capable of detecting travel conditions in the surrounding environment 122.

Environment 122 may be data sources providing relevant data such as weather related data, traffic conditions, etc. In some embodiments, PI computing device 102 may retrieve relevant data from environment 122. Environment 122 may also be information collected by vehicle 116 using sensors to detect current environmental conditions.

A driver operating vehicle 116 may be interested in temporarily providing rides for passengers with TNC 106. Environment 122 may present a variety of hazards. In particular, environment 122 may include data indicating times and locations experiencing high traffic and/or events causing higher demand for transportation services (e.g., peak times). In the exemplary embodiment, PI computing device 102 may receive data from environment 122 and analyze the data to determine dangers and risks of providing rides at the given time. PI computing device 102 may additionally retrieve data from TNC 106 to analyze the supply and demand for rides. In the exemplary embodiment, PI computing device 102 stores the relevant data in database 104 for processing and analysis.

In the exemplary embodiment, PI computing device 102 may generate a model to determine an optimal insurance product offering to provide insurance coverage to a driver operating vehicle 116. In some embodiments, PI computing device 102 may transmit the model to insurance provider 108 and request authorization to offer the determined optimal insurance product offering to the driver. In some embodiments, the insurance product may be offered via TNC 106. In the exemplary embodiment, PI computing device 102 transmits the generated insurance product to user computing device 110 for acceptance. The user may use user computing device 110 to purchase the insurance product and transmit payment to the PI computing device 102. PI computing device 102 may transmit the funds to insurance provider 108 with instructions to initiate insurance coverage.

Figure 2:
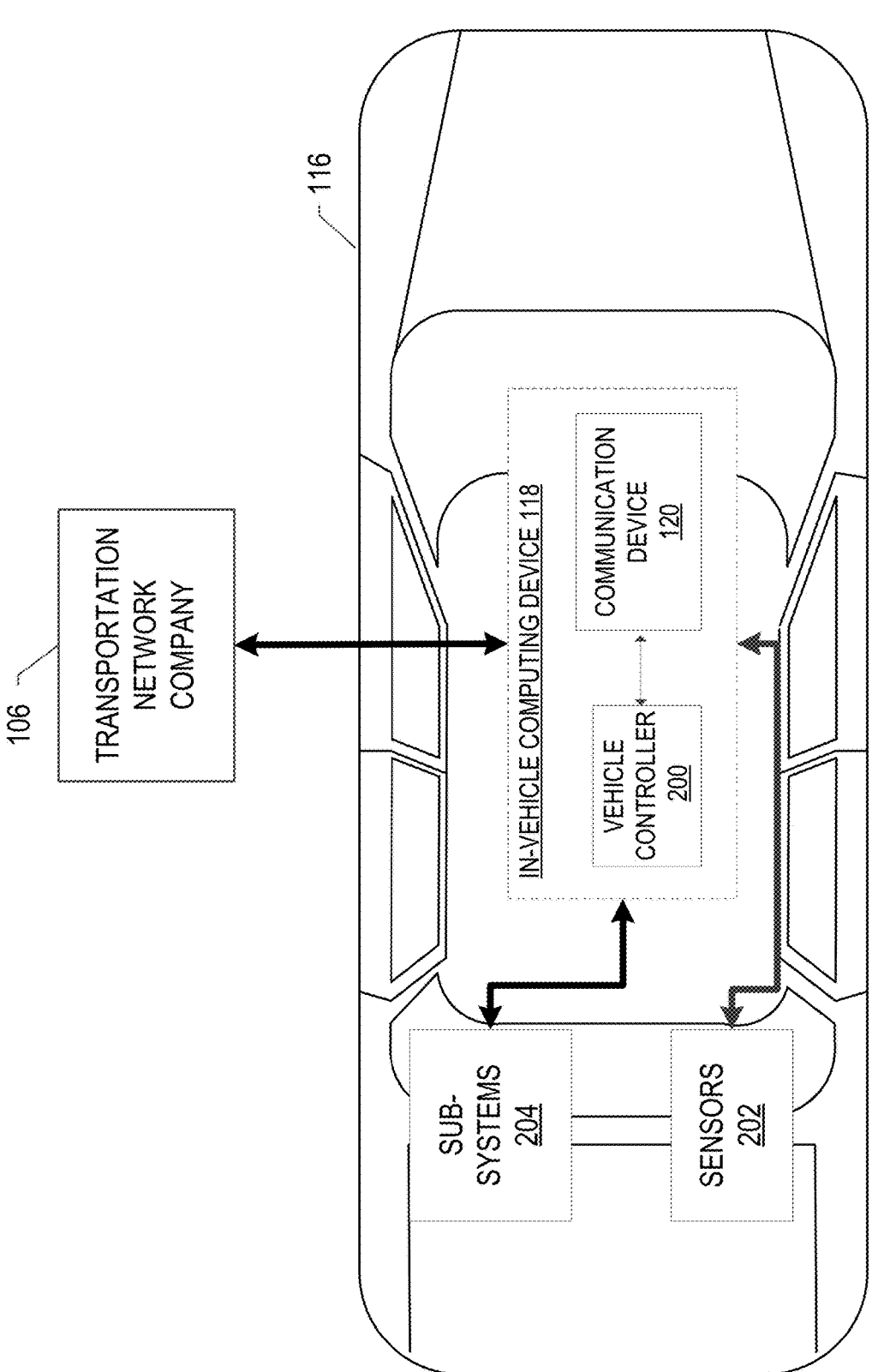
FIG. 2 illustrates an exemplary vehicle used for providing transportation services with a transportation network company.

FIG. 2 illustrates an exemplary vehicle 116 used for providing transportation services with the TNC 106 as described above. In-vehicle computing device 118 may include a vehicle controller 200 in communication with communication device 120. In-vehicle computing device 118 may be in communication with sensors 202 and sub-systems 204. Communication device 120 may be used to communicate with user computing device 110. User computing device 110 may be used to coordinate rides with passengers. In the exemplary embodiment, other user computing devices (not shown) may be used by passengers to arrange for rides through TNC 106.

In the exemplary embodiment, vehicle 116 may be in communication with TNC 106. In some embodiments, vehicle 116 may be in communication with PI computing device 102. In the exemplary embodiment, sub-systems 204 may be configured to control, monitor, and record various aspects of vehicle operations such as acceleration, breaking, and cornering data. Sensors 202 may include temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. Sensors 202 may be configured to detect external conditions such as traffic, weather, and the like. Sensor data and data from sub-systems 204 may be transmitted via communication device 120 to TNC 106 and/or PI computing device 102.

Figure 3:
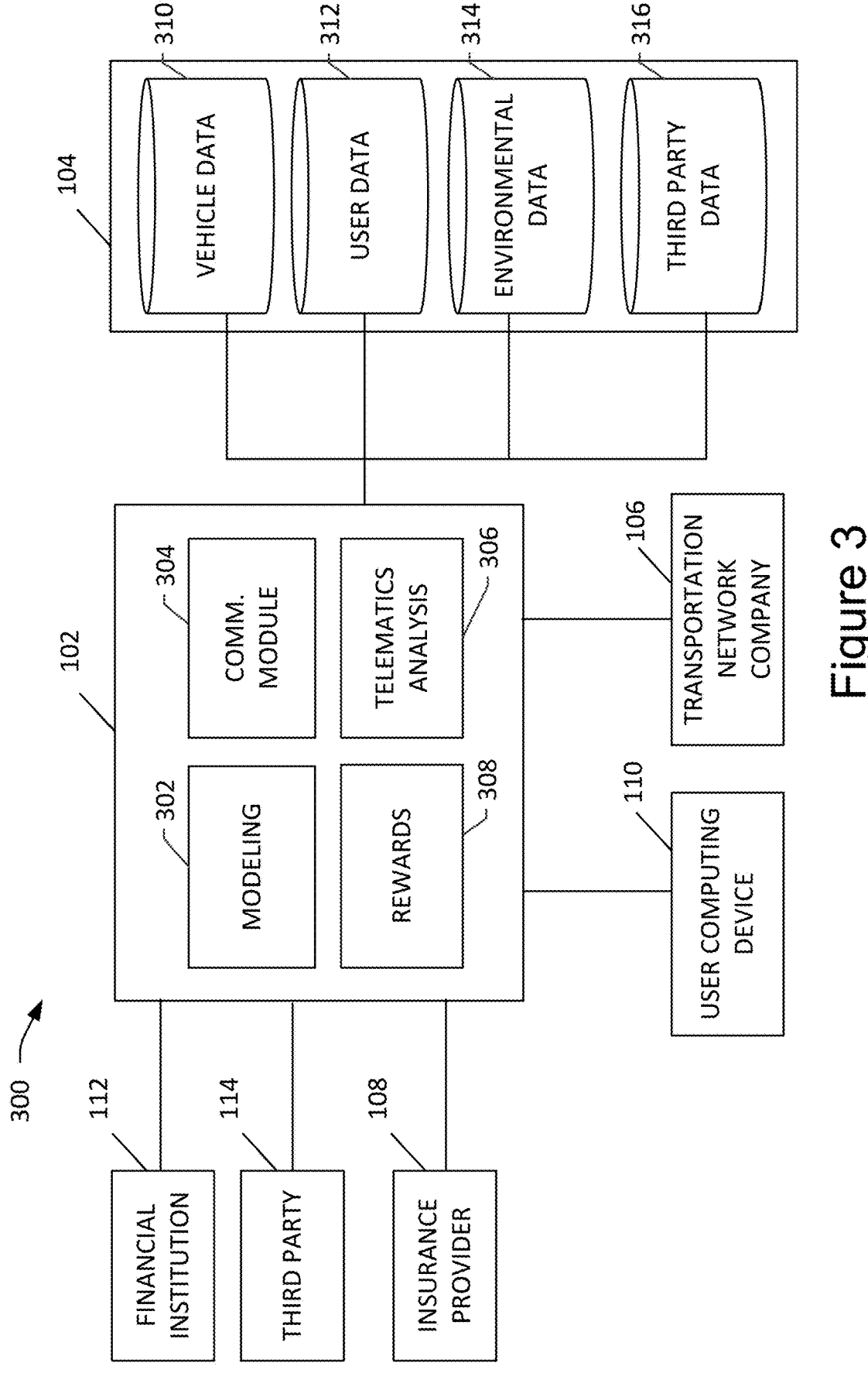
FIG. 3 illustrates a simplified block diagram of an exemplary PI computer system for implementing a computer-implemented process, in accordance with one embodiment of the present disclosure.

FIG. 3 illustrates a simplified block diagram 300 of an exemplary personal insurance ("PI") computing device 102 configured to implement a computer-implemented process. The PI computing device 102 may include a modeling module 302 configured to receive data, process the data, and generate models as described below. PI computing device 102 may also include a communications module 304 for communicating with, for example, TNC 106, insurance provider 108, user computing device 110, financial institution 112, third party 114.

PI computing device 102 may also include a telematics analysis module 306 for analyzing telematics data received from, for example, vehicle 116. PI computing device 102 may also include a rewards module 308 for generating rewards and/or other incentives as described below.

PI computing device 102 may be in communication with TNC 106, insurance provider 108, user computing device 110, financial institution 112, and third party 114. PI computing device 102 may also be in communication with database 104. Database 104 may include a plurality of database storing information such as vehicle data 310, user data 312, environmental data 314, and third party data 316. PI computing device 102 may store and retrieve data respectively to and from each corresponding data set.

Exemplary Method for Modeling Peak Pricing

Figure 4:
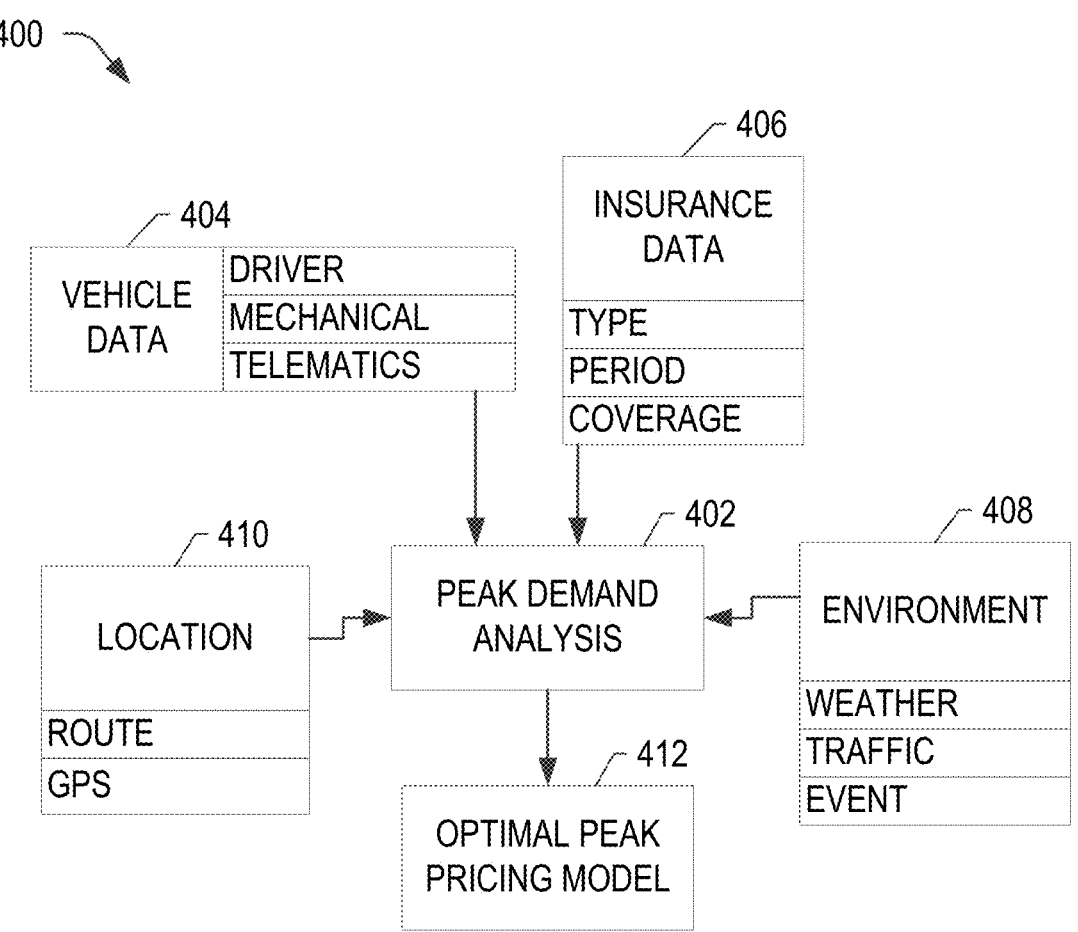
FIG. 4 illustrates an exemplary data structure used to generate an optimal pricing model during peak times using a PI computer system.

FIG. 4 illustrates an exemplary data structure 400 used to generate an optimal pricing model during peak times using PI computer system 100. In the exemplary embodiment, PI computing device 102 performs a peak demand analysis 402 by retrieving from database 104 data such as vehicle data 404, insurance data 406, environment data 408, and location data 410. Peak demand analysis 402 may include processing the data sets by, for example, calculating statistics and/or applying machine learning and/or artificial intelligence algorithms, to generate an optimal peak pricing model 412. The optimal peak pricing model 412 may be executed to determine a unique insurance product offering to the driver of vehicle 116 to provide optimal insurance coverage at an efficient cost.

In the exemplary embodiment, vehicle data 404 may include data such as driver statistics and/or driving history, mechanical information of vehicle 116 such as type, size, age, etc., and telematics data such as driving performance data. Insurance data 406 may include insurance type, coverage period, and coverage amounts. Environment data 408 may be retrieved from environment 122 and may include weather information, traffic information, and event information. Location data 410 may include route information and GPS location data. A data structure may be created using the data sets to perform efficient processing and analysis of the data.

Exemplary Method for Determing Optimal and Efficient Insurance Products

FIG. 5 illustrates a simplified block diagram of an exemplary process 500 for determining and providing optimal insurance product offerings using PI computer system 100. In the exemplary embodiment the PI computing device 102 may receive 502 environment data. The environment data may include weather data, event data, and/or other data associated with an increase in demand for transportation services. PI computing device 102 may determine 504 a level of demand including increased payment offers to drivers. PI computing device 102 may retrieve 506 driver data to identify a potential driver and to retrieve relevant driver statistics and vehicle information.

PI computing device 102 may generate 508 an optimal pricing model based upon the retrieved data. The model may be executed 510 to determine 512 an insurance product offering. PI computing device 514 may transmit the insurance product offering along with the increased payment offers to the identified driver.

Exemplary Hybrid Savings Account Implementation

FIG. 6 illustrates an exemplary diagram of a system 600 implementing a hybrid savings account ("HSA") that may be used with PI computer system 100. In the exemplary embodiment, the system 600 may include the PI computing device 102 as described above. PI computing device 102 may be in communication with TNC 106 as described above. TNC 106 may be in communication with at least one vehicle 116 used for providing transportation services (e.g., rides). Vehicle 116 may include in-vehicle computing device 118 including communication device 120. In the exemplary embodiment, communication device 120 may be used to communicate with user computing device 110 and in communication with insurance provider 108. PI computing device 102 may also be in communication with financial institution 112 and a database 104.

In the exemplary embodiment, PI computing device 102 may offer to establish an HSA for a user using user computing device 110. User computing device 110 may be used by the user to apply for and/or register for the HSA by inputting personal information and a request to establish the HSA into user computing device 110. PI computing device 102 may receive the personal user data from user computing device 110 and process the personal user data to establish the HSA. In some embodiments, PI computing device 102 may transmit a plurality of financial institutions to user computing device 110 to enable a user to select a preferred financial institution to establish and maintain the HSA.

PI computing device 102 receives the financial institution selection from user computing device 110. In the exemplary embodiment, financial institution 112 is used to establish and maintain the HSA in accordance with applicable financial rules and regulations.

In the exemplary embodiment, insurance provider 108 may offer insurance services to the user and may be associated with the HSA. In some embodiments, insurance provider 108 may be permitted to directly withdraw funds from the HSA be executing a transaction with financial institution 112. In the exemplary embodiment, insurance provider 108 transmits requests to PI computing device 102 indicating services have been rendered and payment is due. PI computing device 102 withdraws the funds from the HSA by executing a financial transaction with financial institution 112. PI computing device 102 transmits the funds to insurance provider 108 or otherwise causes the funds to be transferred to insurance provider 108.

In the exemplary embodiment, as the user provides rides to passengers for TNC 106, TNC 106 receives payment from the passengers, retains a portion or percentage, and deposits, transfers, or otherwise provides payment for transportation services provided to PI computing device 102. In some embodiments, payments are deposited in the HSA at financial institution 112.

In some embodiments, funds held in the HSA may be used to purchase supplemental and/or additional insurance coverage from insurance provider 108. PI computing device 102 may facilitate insurance related transactions. Payment transactions for other purposes using funds in the HSA may be otherwise limited.

FIG. 7 illustrates a flow chart 700 of an exemplary computer-implemented process for operating a hybrid savings account that may be used with PI computer system 100. In the exemplary embodiment, a user registers 702 with PI computing device 102 for an HSA. The PI computing device 102 processes 704 the application by, for example, parsing personal information from user input data provided by the user during user registration 702. Processing 704 the application may also include determining a default or user selected service providers (e.g., a preferred financial institution to establish the HSA, a third party service provider such as a preferred insurance provider, etc.) to establish and manage the HSA.

In the exemplary embodiment, PI computing device 102 transmits 706 commands to respective determined parties to: (i) establish the HSA at financial institution 112, and (ii) notify insurance provider 108 of the HSA and to initialize services (e.g., provide insurance coverage) for the user. In the exemplary embodiment, financial institution 112 establishes 708 the HSA based upon the information transmitted from PI computing device 102. Financial institution 112 receives 710 payments and from PI computing device 102 and deposits funds accordingly into the HSA. In some embodiments, the payments may be deposited by the user. In the exemplary embodiment, PI computing device 102 receives 712 payments from a third party (e.g., TNC 106) for performance of services such as driving for TNC 106. PI computing device 102 deposits 714 or causes to be deposited, funds from TNC 106 into the HSA.

Third party entities such as insurance provider 108 initiates 716 insurance coverage based upon information transmitted 706 from PI computing device 102. In the exemplary embodiment, insurance provider 108 may apply 718 the prescribed insurance coverage for the user. Insurance provider 108 may withdraw 720 fees from the HSA based upon the type of insurance coverage requested. For example, for a driver operating a vehicle for a TNC, insurance coverage may be provided on a per-mile basis and fees may be determined based upon accumulate mileage calculated on a periodic basis (e.g., per hour, per day, per week, per month, etc.) and withdrawn on a predetermined timetable.

In the exemplary embodiment, insurance coverage terminates 722 after a period of time. In some embodiments, insurance coverage may terminate 722 after the conclusion of a predetermined event (e.g., at the conclusion of a concert). Upon termination, insurance provider 108 may offer to renew 724 insurance coverage under the same or similar conditions. In some embodiments, renewal 724 may be automatic. PI computing device 102 may instruct insurance provider 108 to again initiate 716 insurance coverage. The user may choose to discontinue the HSA and PI computing device may remit 726 remaining funds to the user.

Exemplary Ratings-Based Model

FIG. 8 illustrates a simplified block diagram 800 of an exemplary data structure used when generating an exemplary overlaid pricing model for use with PI computer system 100. In the exemplary embodiment, PI computing device 102 performs a ratings analysis 802. PI computing device 102 may retrieve 804 driver data, telematics data 806, and passenger rating data 808. PI computing device 102 may analyze the data by, for example, conducting a statistical analysis and/or applying machine learning and/or artificial intelligence algorithms to the data to generate an overlaid pricing model 810.

The retrieved 804 driver data may include, for example, a driving history for the driver and/or attributes associated with the driver such as language spoken, educational background, etc. Telematics data 806 may include vehicle data for vehicle 116 such as vehicle type, performance, age, etc. Telematics data 806 may also include location information of vehicle 116 and route information for a respective trip. Passenger rating data 808 may include trip data, numerical ratings provided by the passengers on each respective trip, and additional comments input by the passengers on the trip.

Overlaid pricing model 810 may include each data set analyzed and aligned such that each rating is applicable to telematics data for that trip. Overlaid pricing model 810 may be executed to determine a driver profile and an optimized insurance product pricing based upon the telematics performance analysis and the ratings received for the driver. In some embodiments, natural language processing may be used to analyze comments input by passengers. For example, word parsing may be used to identify certain driver behaviors where if passengers frequently input words or phrases relating to speed and/or risky driving and the like, overlaid pricing model 810 may reflect the data and indicate higher insurance costs and/or pricing.

FIG. 9 illustrates a simplified block diagram of an exemplary process 900 for generating an exemplary overlaid pricing model 810. In the exemplary embodiment, PI computing device 102 may use modeling module 302 to generate overlaid pricing model 810. PI computing device 102 may retrieve 902 driver data for the driver operating vehicle 116, retrieve 904 ratings data for the driver, and retrieve 906 telematics data for vehicle 116. PI computing device 102 may analyze 908 the retrieved data sets by, for example, categorizing the data, applying natural language parsing of the data, performing statistical analysis on the data, and/or applying machine learning and/or artificial intelligence algorithms on the data.

PI computing device 102 may generate 910 an overlaid pricing model based upon the analysis. PI computing device 912 may execute the overlaid pricing model to determine 914 an optimal insurance product. PI computing may transmit 916 the optimal insurance product to the driver.

Exemplary Rewards-Based Incentive System

FIG. 10 illustrates an exemplary system 1000 for implementing rewards-based incentives for drivers of transportation network companies. In the exemplary embodiment, PI computing device 102 may be in communication with TNC 106, insurance provider 108, user computing device 110, financial institution 112, third party providers 114, and/or a maintenance network 1002.

In the exemplary embodiment, PI computing device 102 may request and/or retrieve maintenance data for vehicle 116 from maintenance network 1002. PI computing device may use the maintenance data to determine a level of operational performance and efficiency and/or otherwise apply a safety rating for vehicle 116.

In the exemplary embodiment, PI computing device 102 may retrieve at least telematics data from database 104 to generate a trip score and/or a driver score for each respective trip provided by the driver of vehicle 116. PI computing device 102 may also retrieve predetermined thresholds from database 104. PI computing device 102 may compare and/or otherwise analyze trip scores and/or driver scores against the thresholds to determine a discount, refund, and/or reward for the driver based upon the analysis. PI computing device may transmit the discounts, cash back, and/or other rewards to a user via user computing device 110.

In some embodiments, PI computing device 102 may transmit a request, command, and/or message to insurance provider 108 to instruct insurance provider 108 to offer a discount on an insurance product. In some embodiments, third party providers 114 and maintenance network 1002 may be similarly instructed to provide a discount. In some embodiments, rewards for safe vehicle operation well maintained vehicles may be in the form of cash deposits in a hybrid savings account as described above.

FIG. 11 illustrates a simplified block diagram of an exemplary process 1100 for implementing rewards-based incentives for drivers of transportation network companies. In the exemplary embodiment, PI computing device 102 may retrieve 1102 telematics data for vehicle 116 for at least one ride provided. PI computing device 102 may generate 1104 a trip score based upon the telematics data and may compare 1106 the trip score to a predetermined threshold. PI computing device 102 may determine 1108 a reward based upon the comparison. PI computing device 102 may receive 1110 payment from a passenger for a completed ride.

In some embodiments, TNC 106 may receive the payment from the passenger and PI computing device 102 may direct TNC 106 to retain a percentage of the payment and transmit the remaining percentage to the driver. In the exemplary embodiment, PI computing device 102 may transmit 1112 a percentage of the received payment to TNC 106 based upon the determined reward. PI computing device 102 may transmit 1114 the remaining payment to the driver. In some embodiments, the reward may be a discount and/or another benefit provided by third party provider 114 or maintenance network 1002. For example, maintenance network 1002 may offer discounted maintenance services for vehicle 116.

Exemplary User Computing Device

FIG. 12 illustrates an exemplary personalized insurance ("PI") computing device 102 (also shown in FIG. 1) in a server system 1200 configuration. In the exemplary embodiment, server system 1200 may include a processor 1202 for executing instructions. Instructions may be stored in a memory area 1204. Processor 1202 may include one or more processing units (e.g., in a multi-core configuration) for executing instructions. The instructions may be executed within a variety of different operating systems on server system such as PI computing device 102 in a server configuration, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 1202 may be operatively coupled to a communication interface 1206 such that server system 1200 is capable of communicating with TNC 106, insurance provider 108, user computing device 110, financial institution 112, third party 114 (all shown in FIG. 1), or another server system 1200. For example, communication interface 1206 may receive requests from user computing device 110 via the Internet.

Processor 1202 may also be operatively coupled to a storage device 1210, such as database 104 (shown in FIG. 1). Storage device 1210 may be any computer-operated hardware suitable for storing and/or retrieving data. In some embodiments, storage device 1210 may be integrated in server system 1200. For example, server system 1200 may include one or more hard disk drives as storage device 1210.

In other embodiments, storage device 1210 may be external to server system 1200 and may be accessed by a plurality of server systems 1200. For example, storage device 1210 may include multiple storage units such as hard disks or solid state disks in a redundant array of inexpensive disks (RAID) configuration. Storage device 1210 may include a storage area network (SAN) and/or a network attached storage (NAS) system.

In some embodiments, processor 1202 may be operatively coupled to storage device 1210 via a storage interface 1208. Storage interface 1208 may be any component capable of providing processor 1202 with access to storage device 1210. Storage interface 1208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1202 with access to storage device 1210.

Memory area 1204 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Client Computing Device

FIG. 13 illustrates an exemplary user computing device 110 (also shown in FIG. 1). User computing device 110 may include a processor 1302 for executing instructions. In some embodiments, executable instructions may be stored in a memory area 1304. Processor 1302 may include one or more processing units (e.g., in a multi-core configuration). Memory area 1304 may be any device allowing information such as executable instructions and/or other data to be stored and retrieved. Memory area 1304 may include one or more computer readable media.

In exemplary embodiments, user computing device 110 may also include at least one media output component 1306 for presenting information to a user 1300. Media output component 1306 may be any component capable of conveying information to user 1300. In some embodiments, media output component 1306 may include an output adapter such as a video adapter and/or an audio adapter. An output adapter may be operatively coupled to processor 1302 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

User computing device 110 may also include an input device 1308 for receiving input from user 1300. Input device 1308 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 1306 and input device 1308.

User computing device 110 may also include a communication interface 1310, which can be communicatively coupled to a remote device such as PI computing device 102 (shown in FIG. 1). Communication interface 1310 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1304 may be, for example, computer readable instructions for providing a user interface to user 1300 via media output component 1306 and, optionally, receiving and processing input from input device 1308. A user interface may include, among other possibilities, a web browser and client application. Web browsers may enable users, such as user 1300, to display and interact with media and other information typically embedded on a web page or a website. A client application may allow user 1300 to interact with a server application from PI computing device 102.

Memory area 1304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Embodiments & Functionality

A personalized insurance ("PI") computing device for determining an optimal usage-based insurance product for a driver operating a vehicle for the transportation network company ("TNC") during a period of increased demand for transportation services may be provided. The PI computing device may have at least one processor (and/or associated transceiver) in communication with at least one memory. The processor and/or associated transceiver may be configured to receive, from a transportation network company, data indicating the increased demand for transportation services (such as via wireless communication or data transmission over one or more radio frequency links). The processor and/or associated transceiver may be further configured to receive or retrieve driver data for a driver operating a vehicle for the transportation network company, wherein the driver data includes at least the driver history. The processor may be further configured to generate an optimal pricing model for the driver based upon the increased demand and the driver data. The processor may be further configured to execute the model to determine an optimal insurance product, wherein the optimal insurance product includes characteristics reflecting the risks associated with the increased demand for transportation services and a risk profile from analyzing the driver data. The processor and/or associated transceiver may be further configured to transmit, to a user computing device, an offer to: (i) provide transportation services to passengers at an increased payment rate with (ii) the determined insurance product.

In one embodiment, the processor and/or associated transceiver may be further configured to receive or retrieve event data from a third party, the event data indicating an increased demand for transportation services and a time period for the increased demand. In another embodiment, the processor and/or associated transceiver may be further configured to receive or retrieve weather data from a weather service, and wherein generating the optimal pricing model includes factoring in the weather data. The weather data may include a time period for at least one predicted weather event, and the insurance product may include an expiration associated with the time period predicted at least one weather event.

In another embodiment, the PI computing device may be in communication with an insurance provider and the insurance product is underwritten by an insurance provider. In another embodiment, the increased payment rate is based upon a payment rate offered by the TNC, wherein the increased payment rate less than the payment rate offered by the TNC, and wherein the difference between the increased payment rate and the payment rate offered by the TNC is transferred to the insurance provider. In another embodiment, executing the model to determine the optimal insurance product may include determining a price for the insurance product, wherein determining the price may be based upon at least the difference between the increased payment rate and the payment rate offered by the TNC.

In another aspect, a personalized insurance ("PI") computing device for facilitating automatic insurance payments through a hybrid savings account ("HSA") associated with a driver operating a vehicle for a transportation network company ("TNC") may be provided. The PI computing device having at least one processor (and/or associate transceiver) in communication with at least one memory, the processor and/or associated transceiver) may be configured to receive, from the TNC, funds earned by a driver operating the vehicle for the TNC (such as via wireless communication or data transmission over one or more radio frequency links). The processor and/or associated transceiver may be further configured to transmit (such as via wireless communication or data transmission over one or more radio frequency links) the funds to the financial institution to be deposited into the HSA associated with the driver. The processor and/or transceiver may be further configured to receive (such as via wireless communication or data transmission over one or more radio frequency links), from a user computing device associated with the driver, a signal indicating (i) initiation of a ride for a passenger, and (ii) a request for insurance coverage for the ride. The processor may be further configured to transfer, from the HSA to an insurance provider, payment for the requested insurance coverage.

In one embodiment, the processor and/or associated transceiver may be further configured to transmit a message to the insurance provider indicating a completion of the ride to terminate the insurance coverage. In another embodiment, the processor and/or associated transceiver may be further configured to transmit a message to the insurance provider server to automatically renew the insurance coverage upon termination of the insurance coverage. In another embodiment, the processor and/or associated transceiver may be further configured to receive a message to close the HSA, determine a balance owed to the insurance provider, withdraw the funds from the HSA, and transmit the balance to the insurance provider server or other computing device, and/or transmit remaining funds to a computing device associated with the driver.

In one embodiment, the processor and/or associated transceiver may be further configured to receive a request to withdraw funds from the HSA by the insurance provider. In another embodiment, the processor and/or associated transceiver may be further configured to transmit a message to the financial institution to establish the HSA, the message including at least one entity authorized to access the HSA. In another embodiment, the processor and/or associated transceiver may be in communication with a third-party and wherein the processor and/or associated transceiver is configured to (i) receive a request from the user computing device for a purchase from a computing device of the third-party, and (ii) transmit funds to the third-party computing device from the HSA.

In another aspect, a personalized insurance PI computing device for determining a ratings-based insurance product for a driver of a transportation network company operating a vehicle for the transportation network company may be provided. The PI computing device may have at least one processor in communication with at least one memory. The processor may be configured to (i) retrieve ratings for a driver, (ii) generate a risk model for the driver based upon the ratings, (iii) execute the risk model to determine an optimal insurance product, and (iv) transmit the optimal insurance product to the driver.

One embodiment may be where the processor is further configured to receive the ratings from a user computing device associated with a passenger, wherein the ratings are associated with a ride provided to the passenger, and wherein the ratings include at least one numerical score associated with the ride provided by the driver; and store the ratings in the memory.

Another embodiment may be where the ratings includes a description, input by a passenger, of a ride provided by the driver, and wherein the processor is further configured to (i) parse the description, input by the passenger, using natural language processing; and (ii) analyze the parsed description to determine a numerical score corresponding to a rating for the ride provided by the driver.

A further embodiment may be where the ratings include performance metrics for at least one ride provided to a passenger, the performance metrics retrieved from measurement devices on the vehicle, the performance metrics including telematics data, the telematics data including at least one of acceleration data, braking data, and cornering data.

Another embodiment may be where generating a risk model includes overlaying the retrieved ratings with data associated with a geographic region associated with a route for a ride provided to a passenger.

A further embodiment may be where generating the risk model includes incorporating an optimal pricing model. The processor may be further configured to (i) retrieve, from the transportation network company, data indicating a level of demand for transportation services; and (ii) generate the optimal pricing model based upon the retrieved demand data.

In yet another embodiment, the PI computing device may be in communication with a financial institution configured to manage a health savings account for the driver, and wherein the processor is further configured to (i) receive, from a user computing device associated with the driver, a signal indicating a purchase of the optimal insurance product; and (ii) transmit a signal to the financial institution to withdraw an amount of funds from the health savings account for the purchase of the optimal insurance product.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about infrastructures and users associated with a building to detect events and correlations between detected events to identify trends.

Based upon these analyses, the processing element may learn how to identify characteristics and patterns that may then be applied to analyzing image data, model data, and/or other data. For example, the processing element may learn, with the user's permission or affirmative consent, to identify the type of building events that occurred based upon collected images of building. The processing element may also learn how to identify building trends that may not be readily apparent based upon collected sensor data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A data analytics computing device in communication with a transportation network company ("TNC") computing device that is associated with a TNC, and a vehicle computing device associated with a vehicle that at least periodically operates as part of the TNC, the data analytics computing device having at least one processor in communication with at least one memory, the at least one processor configured to:

train, using one or more machine learning programs, a driving model of a driver of the vehicle by applying to the driver model (i) telematics data collected while the driver is operating the vehicle, and (ii) ratings of the driver while operating the vehicle as part of the TNC;

receive additional telematics data and environment data indicative of current environmental conditions of an area where the vehicle is being operated;

receive, in real-time from the TNC computing device, vehicle usage data indicative of a current demand of vehicles as compared to a current supply of vehicles operating as part of the TNC;

further train, using the one or more machine learning programs, the driving model by applying the additional telematics data, the environment data, and the vehicle usage data to the driving model;

determine, in real-time, personalized coverage for the driver currently operating the vehicle as part of the TNC by executing, in real-time, the further trained driving model; and transmit, to a user computing device associated with the driver, the personalized coverage.

2. The data analytics computing device of claim 1, wherein the at least one processor is further configured to receive the telematics data from the vehicle computing device, the telematics data associated with operation of the vehicle and collected by a plurality of sensors associated with the vehicle.

3. The data analytics computing device of claim 1, wherein the at least one processor is further configured to generate, using the one or more machine learning programs, the driving model.

4. The data analytics computing device of claim 1, wherein the at least one processor is further configured to:

receive additional ratings of the driver for a more recent operation of the vehicle; and further train the driving model by applying the additional ratings to the driving model.

5. The data analytics computing device of claim 1, wherein rating of the driver and additional ratings of the driver are associated with a condition of the vehicle.

6. The data analytics computing device of claim 1, wherein the at least one processor is further configured to generate the driving model by overlaying ratings of the driver with data associated with a geographic region including a route for a ride provided to a passenger of the vehicle.

7. A computer-implemented method using a data analytics computing device in communication with a transportation network company ("TNC") computing device that is associated with a TNC, and a vehicle computing device associated with a vehicle that at least periodically operates as part of the TNC, the data analytics computing device having at least one processor in communication with at least one memory, the method comprising:

training, using one or more machine learning programs, a driving model of a driver of the vehicle by applying to the driver model (i) telematics data collected while the driver is operating the vehicle, and (ii) ratings of the driver while operating the vehicle as part of the TNC;

receiving additional telematics data and environment data indicative of current environmental conditions of an area where the vehicle is being operated;

receiving, in real-time from the TNC computing device, vehicle usage data indicative of a current demand of vehicles as compared to a current supply of vehicles operating as part of the TNC;

further training, using the one or more machine learning programs, the driving model by applying the additional telematics data, the environment data, and the vehicle usage data to the driving model;

determining, in real-time, personalized coverage for the driver currently operating the vehicle as part of the TNC by executing, in real-time, the further trained driving model; and transmitting, to a user computing device associated with the driver, the personalized coverage.

8. The computer-implemented method of claim 7 further comprising receiving the telematics data from the vehicle computing device, the telematics data associated with operation of the vehicle and collected by a plurality of sensors associated with the vehicle.

9. The computer-implemented method of claim 7 further comprising generating, using the one or more machine learning programs, the driving model.

10. The computer-implemented method of claim 7 further comprising:

receiving additional ratings of the driver for a more recent operation of the vehicle; and further training the driving model by applying the additional ratings to the driving model.

11. The computer-implemented method of claim 7, wherein rating of the driver and additional ratings of the driver are associated with a condition of the vehicle.

12. The computer-implemented method of claim 7 further comprising generating the driving model by overlaying ratings of the driver with data associated with a geographic region including a route for a ride provided to a passenger of the vehicle.

13. At least one non-transitory computer-readable storage medium having computer-executable instructions embodied thereon, when executed by at least one processor of a data analytics computing device in communication with a transportation network company ("TNC") computing device that is associated with a TNC, and a vehicle computing device associated with a vehicle that at least periodically operates as part of the TNC, the at least one processor in communication with at least one memory, the computer-executable instructions cause the at least one processor to:

train, using one or more machine learning programs, a driving model of a driver of the vehicle by applying to the driver model (i) telematics data collected while the driver is operating the vehicle, and (ii) ratings of the driver while operating the vehicle as part of the TNC;

receive additional telematics data and environment data indicative of current environmental conditions of an area where the vehicle is being operated;

receive, in real-time from the TNC computing device, vehicle usage data indicative of a current demand of vehicles as compared to a current supply of vehicles operating as part of the TNC;

further train, using the one or more machine learning programs, the driving model by applying the additional telematics data, the environment data, and the vehicle usage data to the driving model;

determine, in real-time, personalized coverage for the driver currently operating the vehicle as part of the TNC by executing, in real-time, the further trained driving model; and transmit, to a user computing device associated with the driver, the personalized coverage.

14. The at least one non-transitory computer-readable storage medium of claim 13, wherein the computer-executable instructions further cause the at least one processor to receive the telematics data from the vehicle computing device, the telematics data associated with operation of the vehicle and collected by a plurality of sensors associated with the vehicle.

15. The at least one non-transitory computer-readable storage medium of claim 13, wherein the computer-executable instructions further cause the at least one processor to generate, using the one or more machine learning programs, the driving model.

16. The at least one non-transitory computer-readable storage medium of claim 13, wherein the computer-executable instructions further cause the at least one processor to:

receive additional ratings of the driver for a more recent operation of the vehicle; and further train the driving model by applying the additional ratings to the driving model.

17. The at least one non-transitory computer-readable storage medium of claim 13, wherein the computer-executable instructions further cause the at least one processor to generate the driving model by overlaying ratings of the driver with data associated with a geographic region including a route for a ride provided to a passenger of the vehicle.

* * * * *